(12) United States Patent
Kishi

(10) Patent No.: US 7,702,513 B2
(45) Date of Patent: Apr. 20, 2010

(54) HIGH QUALITY IMAGE AND AUDIO CODING APPARATUS AND METHOD DEPENDING ON THE ROI SETTING

(75) Inventor: Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1032 days.

(21) Appl. No.: 10/656,375

(22) Filed: Sep. 8, 2003

(65) Prior Publication Data

US 2004/0057514 A1    Mar. 25, 2004

(30) Foreign Application Priority Data

Sep. 19, 2002    (JP)    ............................. 2002-273254

(51) Int. Cl.
*G10L 19/00*    (2006.01)
*G10L 21/02*    (2006.01)
*G06K 9/36*    (2006.01)
*G06K 9/46*    (2006.01)
*H04N 7/26*    (2006.01)

(52) U.S. Cl. ....................... 704/500; 704/228; 704/230; 382/243; 382/232; 386/109; 386/112

(58) Field of Classification Search ................. 704/500, 704/230, 228; 382/243, 232; 386/112, 109
See application file for complete search history.

(56) References Cited

U.S. PATENT DOCUMENTS

| 5,091,955 | A | * | 2/1992 | Iseda et al. | .................. | 704/230 |
| 5,115,469 | A | * | 5/1992 | Taniguchi et al. | ........... | 704/228 |
| 6,141,446 | A | * | 10/2000 | Boliek et al. | ................. | 382/233 |
| 6,173,265 | B1 | * | 1/2001 | Takahashi | .................... | 704/262 |
| 6,188,831 | B1 | | 2/2001 | Ichimura | ..................... | 386/69 |
| 6,309,424 | B1 | * | 10/2001 | Fallon | .......................... | 341/51 |
| 6,393,393 | B1 | * | 5/2002 | Kawahara | .................. | 704/229 |
| 6,496,607 | B1 | * | 12/2002 | Krishnamurthy et al. | .... | 382/282 |
| 6,526,175 | B2 | * | 2/2003 | Sodagar et al. | .............. | 382/240 |
| 6,604,070 | B1 | * | 8/2003 | Gao et al. | .................... | 704/222 |
| 6,605,768 | B2 | * | 8/2003 | Date et al. | .................... | 84/604 |
| 6,658,383 | B2 | * | 12/2003 | Koishida et al. | ............ | 704/229 |

(Continued)

FOREIGN PATENT DOCUMENTS

JP    06-030402    2/1994

(Continued)

OTHER PUBLICATIONS

Jan. 8, 2008 Japanese Official Action in Japanese Patent Appln. No. 2002-273254 (with partial translation).

*Primary Examiner*—David R Hudspeth
*Assistant Examiner*—Paras Shah
(74) *Attorney, Agent, or Firm*—Fitzpatrick, Cella, Harper & Scinto

(57) ABSTRACT

Disclosed are an image processing apparatus and an image processing method capable of changing a quality of audio data according to a degree of significance of an image. The image processing apparatus includes an image encoding unit for encoding image data inputted, an audio data encoding unit for encoding audio data inputted together with the image data, a significant scene setting unit for setting to encode a part of region of the image with a high image quality, and an audio data encoding setting unit for setting to process the audio data with a high quality in accordance with the setting by the significant scene setting unit.

13 Claims, 28 Drawing Sheets

U.S. PATENT DOCUMENTS

| | | | |
|---|---|---|---|
| 6,678,468 B2 * | 1/2004 | Tatsumi et al. | 386/111 |
| 6,718,183 B1 * | 4/2004 | Blust et al. | 455/560 |
| 6,741,649 B1 * | 5/2004 | Ishiyama et al. | 375/240.12 |
| 6,879,726 B2 * | 4/2005 | Sato et al. | 382/239 |
| 7,065,250 B1 * | 6/2006 | Lennon | 382/224 |
| 7,080,010 B2 * | 7/2006 | Shlomot et al. | 704/229 |
| 7,106,906 B2 * | 9/2006 | Iwamura | 382/236 |
| 7,236,688 B2 * | 6/2007 | Honjo | 386/109 |
| 2001/0048770 A1 * | 12/2001 | Maeda | 382/243 |
| 2002/0054710 A1 * | 5/2002 | Nagasaki | 382/239 |
| 2003/0012560 A1 * | 1/2003 | Mori et al. | 386/109 |

FOREIGN PATENT DOCUMENTS

| | | |
|---|---|---|
| JP | 07-203434 | 8/1995 |
| JP | 10-214270 | 8/1998 |
| JP | 11-205740 | 7/1999 |
| JP | 2001-069011 | 3/2001 |
| JP | 2001-230947 | 8/2001 |
| JP | 2001230947 A * | 8/2001 |
| JP | 2001-346177 | 12/2001 |
| JP | 2002171529 A * | 6/2002 |

* cited by examiner

BIT "1" IS ASSIGNED TO
A PIXEL OF GRAY, AND
BIT "0" IS ASSIGNED TO
A PIXEL OF WHITE

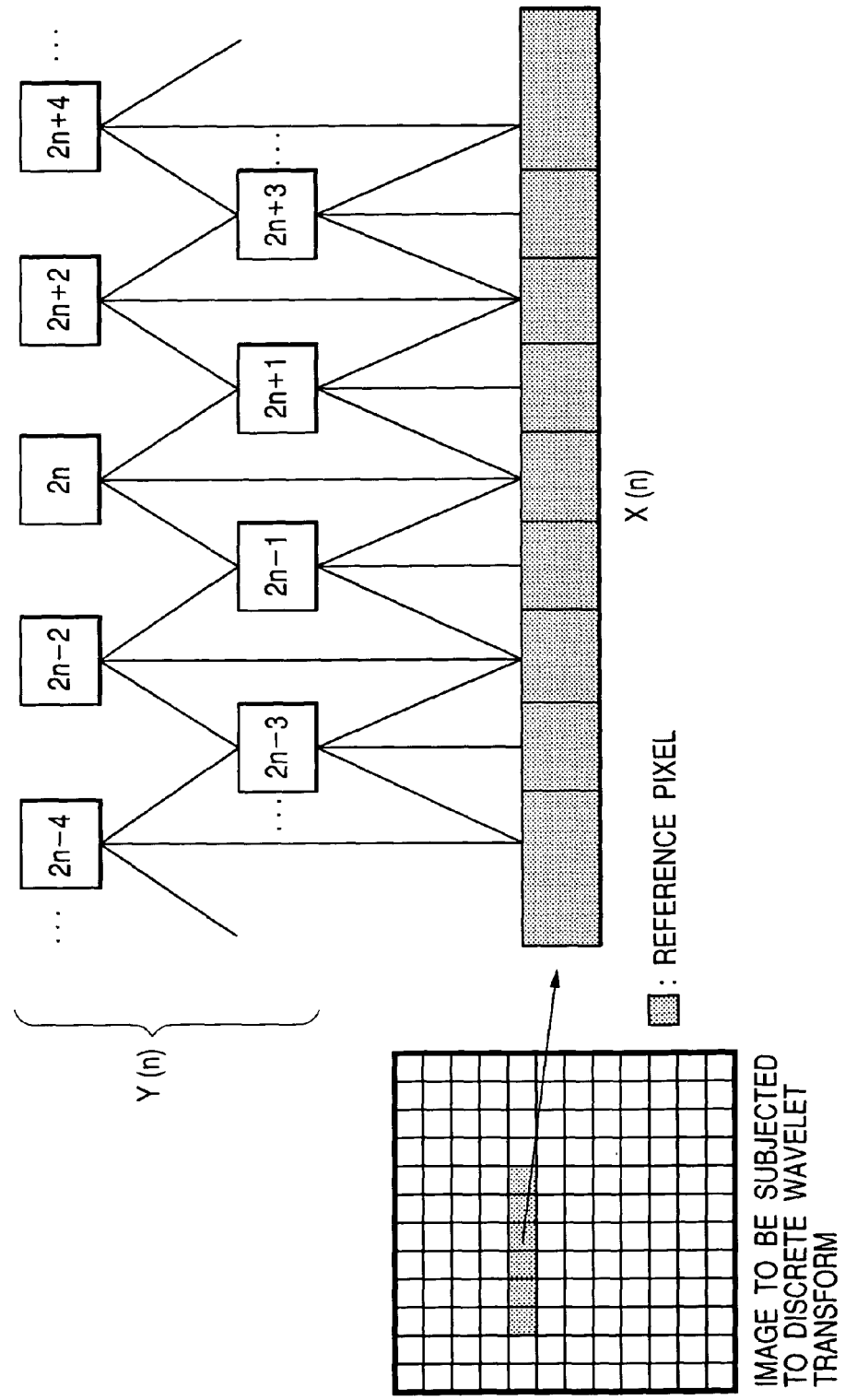

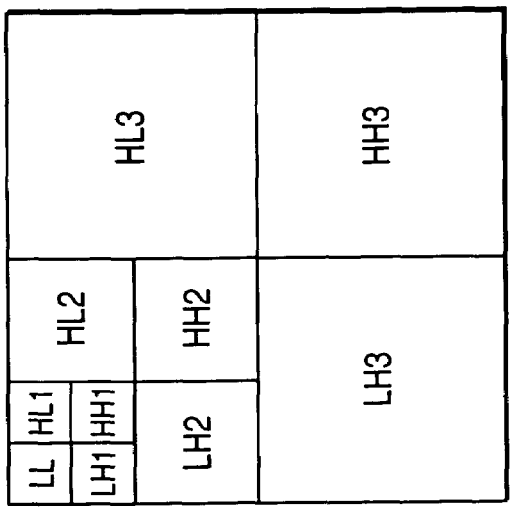
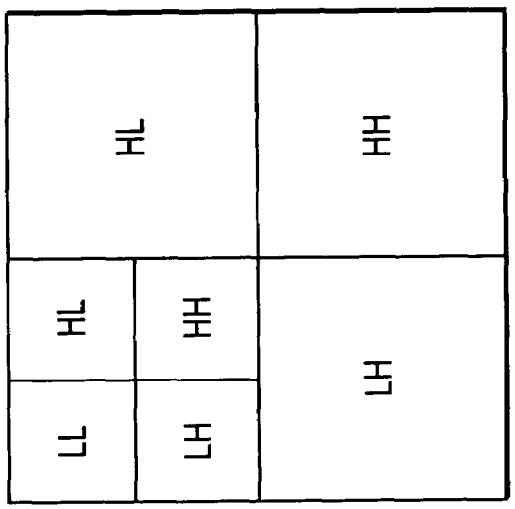
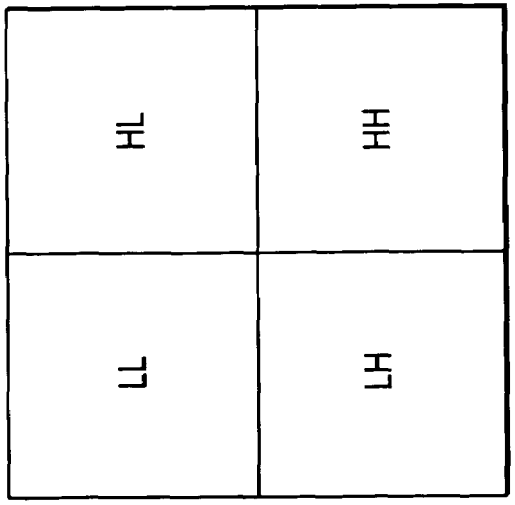

FIG. 16

| FREQUENCY COMPONENT | QUANTIZATION STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

HIGH QUALITY IMAGE AND AUDIO CODING APPARATUS AND METHOD DEPENDING ON THE ROI SETTING

BACKGROUND OF THE INVENTION

1. Field of the Invention

The present invention relates to an image processing apparatus for encoding an image (image data) and a voice (audio data) and to a method thereof.

2. Related Background Art

A digital video camera and a digital still camera for private use may be given as recording/reproducing apparatuses capable of recording and reproducing an image. Each of these apparatuses executes processing of compressing image data when recording and transmitting the image such as a still image and a moving image.

General standards related to an image compression technology are exemplified such as JPEG (Joint Photographic Experts Group) for the still image and Motion-JPEG, MPEG1 (Moving Picture Experts Group 1), MPEG2 and MPEG4 for the moving image, and recently an examination of new standards such as JPEG2000 is underway.

Further, some of the image compression technologies are capable of encoding a specific region of the image with a higher image quality than in other regions. For example, in case an ROI (Region Of Interest) encoding method is used, an ROI region within a certain picture image can be displayed with the high image quality after being decoded or can be preferentially displayed when being transmitted.

Japanese Patent Application Laid-Open No.2001-230947 discloses a digital still camera, conceived as a camera utilizing such an ROI encoding method, capable of recording and reproducing by effecting the ROI setting of a specified region in a picked-up image and a compression thereof. In the case of performing the ROI setting in the camera, an ROI setting area or object includes a significant and interesting subject in the picture in many cases.

By the way, in the case of applying the ROI setting for a moving image, it is considered that the ROI setting can be done on a frame-by-frame basis in frames forming the moving image. At this time, the frame (ROI frame) including the ROI contains the interesting subject and is therefore considered more significant to a photographer than a frame containing no ROI (which is called a non-ROI frame).

On the occasion of reproducing the moving image data that are encoded including the ROI frame, however, the encoded moving image data are merely decoded and displayed irrespective of the significance described above. Namely, even in a case where the significance is differentiated between the frames, it is impossible to change even a quality of audio data reproduced together with the moving image, in accordance with this significance.

SUMMARY OF THE INVENTION

An object of the present invention is to solve the above-described problem.

Another object of the invention is to provide an image processing apparatus and a method thereof that have such an architecture as to emphasize a significance of a picture by enhancing a quality of audio data to be reproduced during a period for which ROI is contained in a moving image to be reproduced and are capable of performing an expression exhibiting a high visual effect.

As a preferred embodiment for such objects, the present invention discloses an image processing apparatus comprising image encoding means for encoding image data inputted, an audio data encoding means for encoding audio data inputted together with the image data, an image encoding setting means for setting the image encoding means to encode the image data so that a scene exhibiting a high degree of significance is encoded with a high image quality, and an audio data encoding setting means for setting the audio data encoding means to process the audio data in accordance with the setting by the image encoding setting means so that the audio data is processed with a high acoustic quality.

Further, the present invention discloses an image processing method comprising an image encoding step of inputting a moving image and encoding image data thereof, an audio data encoding step of encoding audio data inputted together with the moving image, an image encoding setting step of setting the image encoding step to encode, with a high image quality, a partial region of each of frame images forming the moving image, and an audio data encoding setting step of setting the audio data encoding step to process the audio data with a high definition in accordance with the setting in the image encoding setting step.

Still other objects of the present invention, and the advantages thereof, will become fully apparent from the following detailed description of the embodiments.

BRIEF DESCRIPTION OF THE DRAWINGS

FIG. 14 is an explanatory view of a one-dimensional discrete wavelet transform;

FIG. 15A is a view showing how a sub-band is divided into four sub-bands; FIG. 15B is a view showing how an LL sub-band in FIG. 15A is further divided into four sub-bands; FIG. 15C is a view showing how the LL sub-band in FIG. 15B is further divided into four sub-bands;

FIG. 16 is an explanatory view of a quantization step;

DETAILED DESCRIPTION OF THE PREFERRED EMBODIMENTS

The preferred embodiments of the present invention will now be described in detail hereinafter with reference to the accompanying drawings.

First Embodiment

Figure 1:
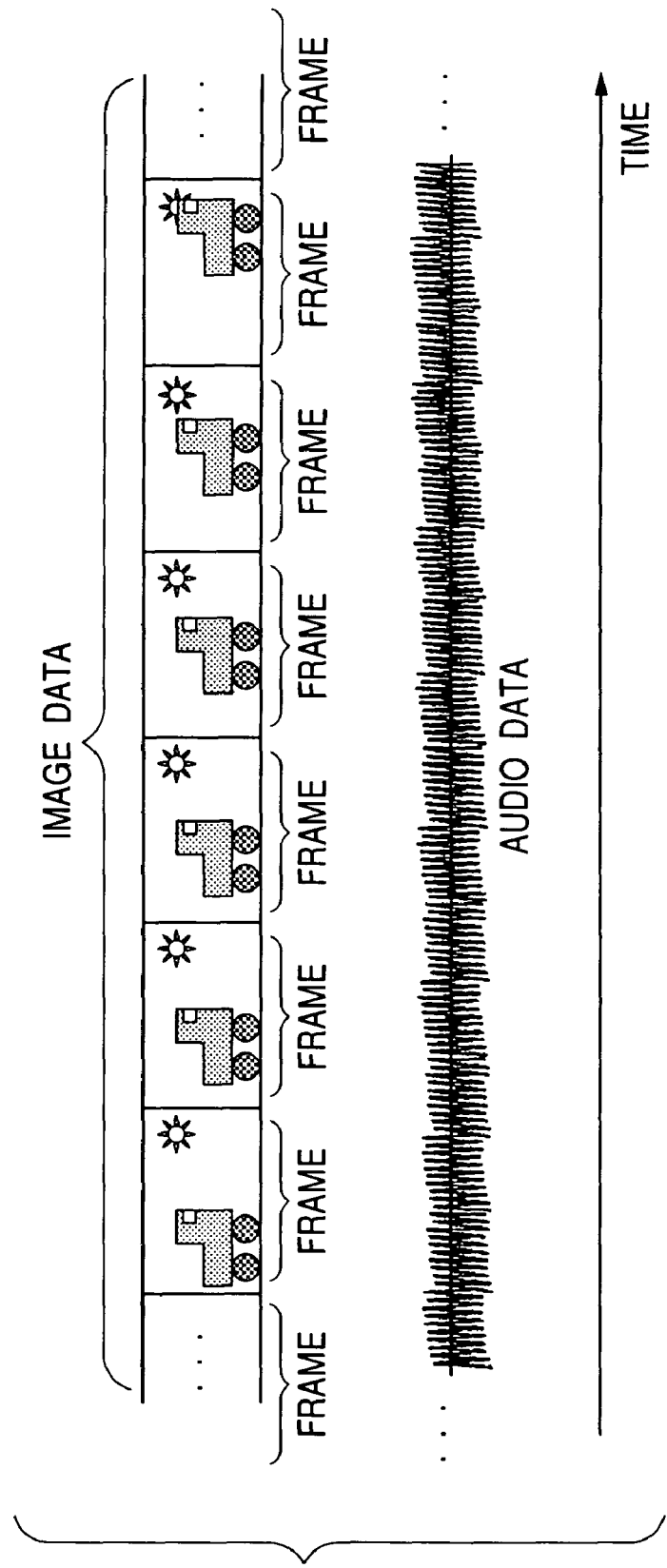
FIG. 1 is an explanatory view of moving image data used in the present invention.

Video data to be dealt with in the embodiments of the present invention are, as shown in FIG. 1, composed of image data structured of an aggregation of a plurality of frames each formed for every period (1/30 sec may be given by way of one example) and audio data corresponding to the image data.

Figure 2:
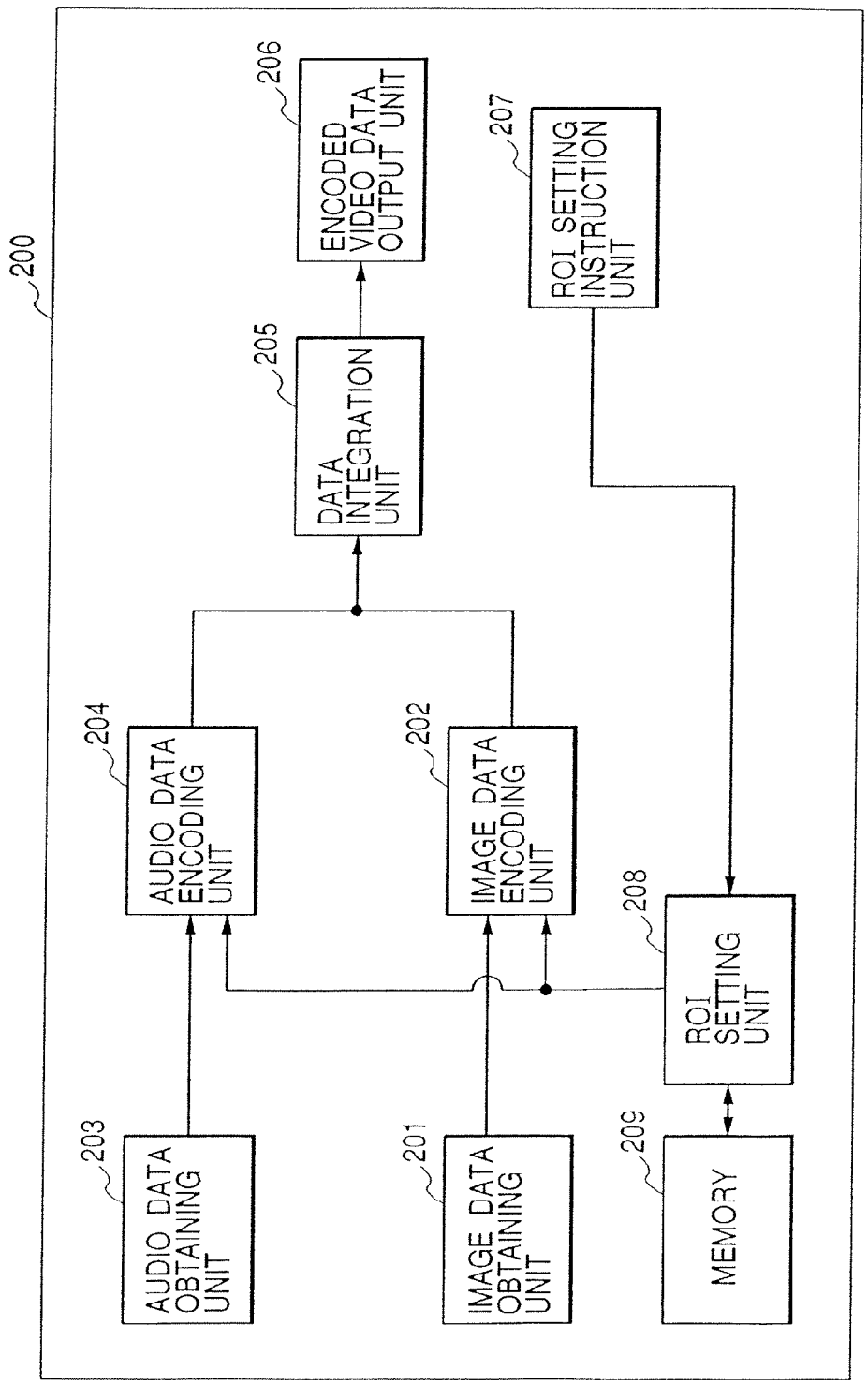
FIG. 2 is a block diagram of an image processing apparatus 200 in a first embodiment of the present invention.
Figure 3:
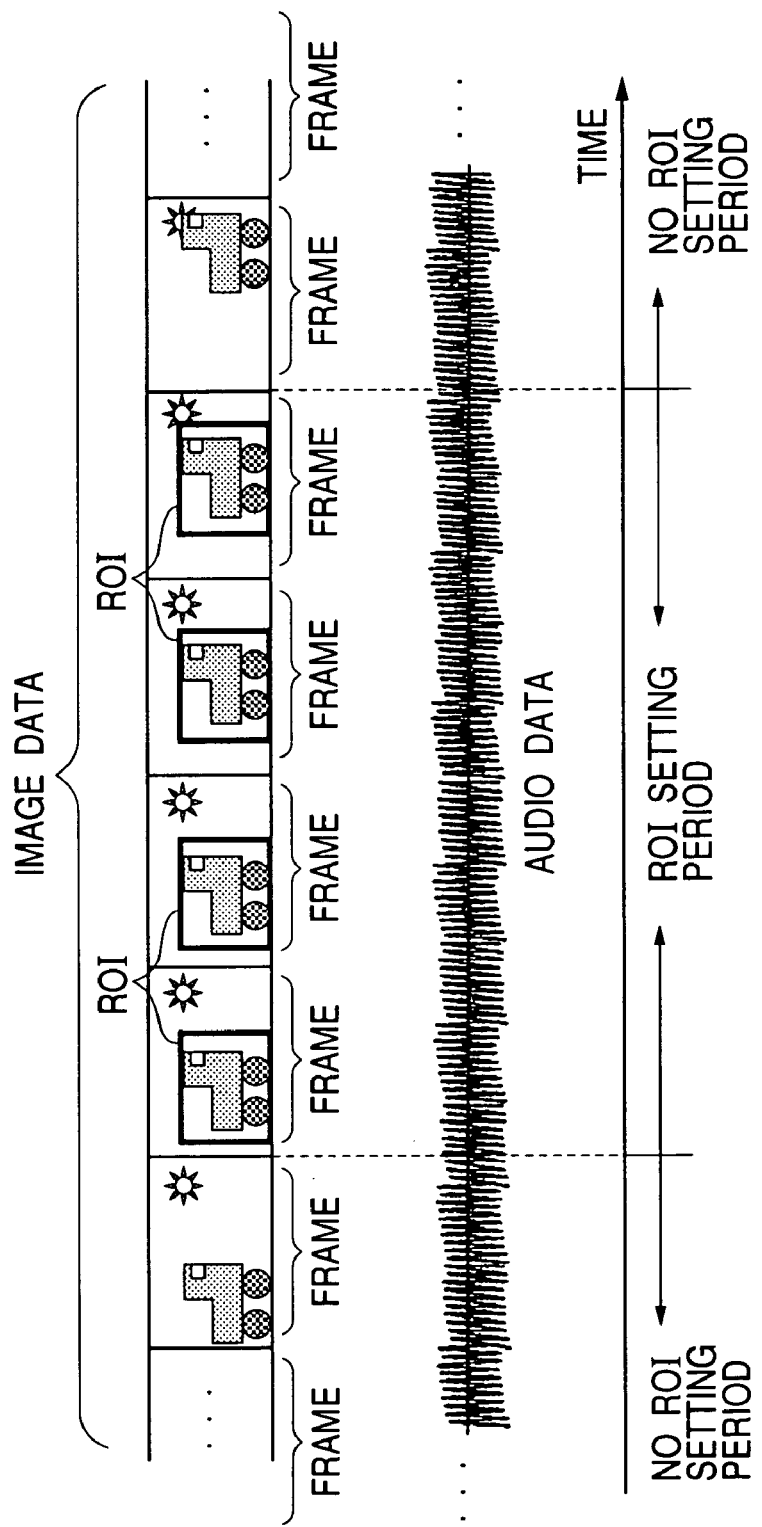
FIG. 3 is an explanatory view of an ROI setting period and an ROI non-setting period.

An image processing apparatus 200 in the first embodiment, illustrated in FIG. 2, is capable of performing, as illustrated in FIG. 3, ROI (Region Of Interest) setting for arbitrary regions in arbitrary frames of such video data. Further, the image processing apparatus 200 in the first embodiment is constructed to take a ROI setting period into consideration as a mark of a significant scene and executes, when in reproduction processing, encoding processing of audio data so as to change a bit rate (an amount of assignment bits) so that a quality of the audio data outputted for this ROI setting period becomes higher than a quality of the audio data outputted for an ROI non-setting period. Details of this construction will be given as follows.

Figure 4:
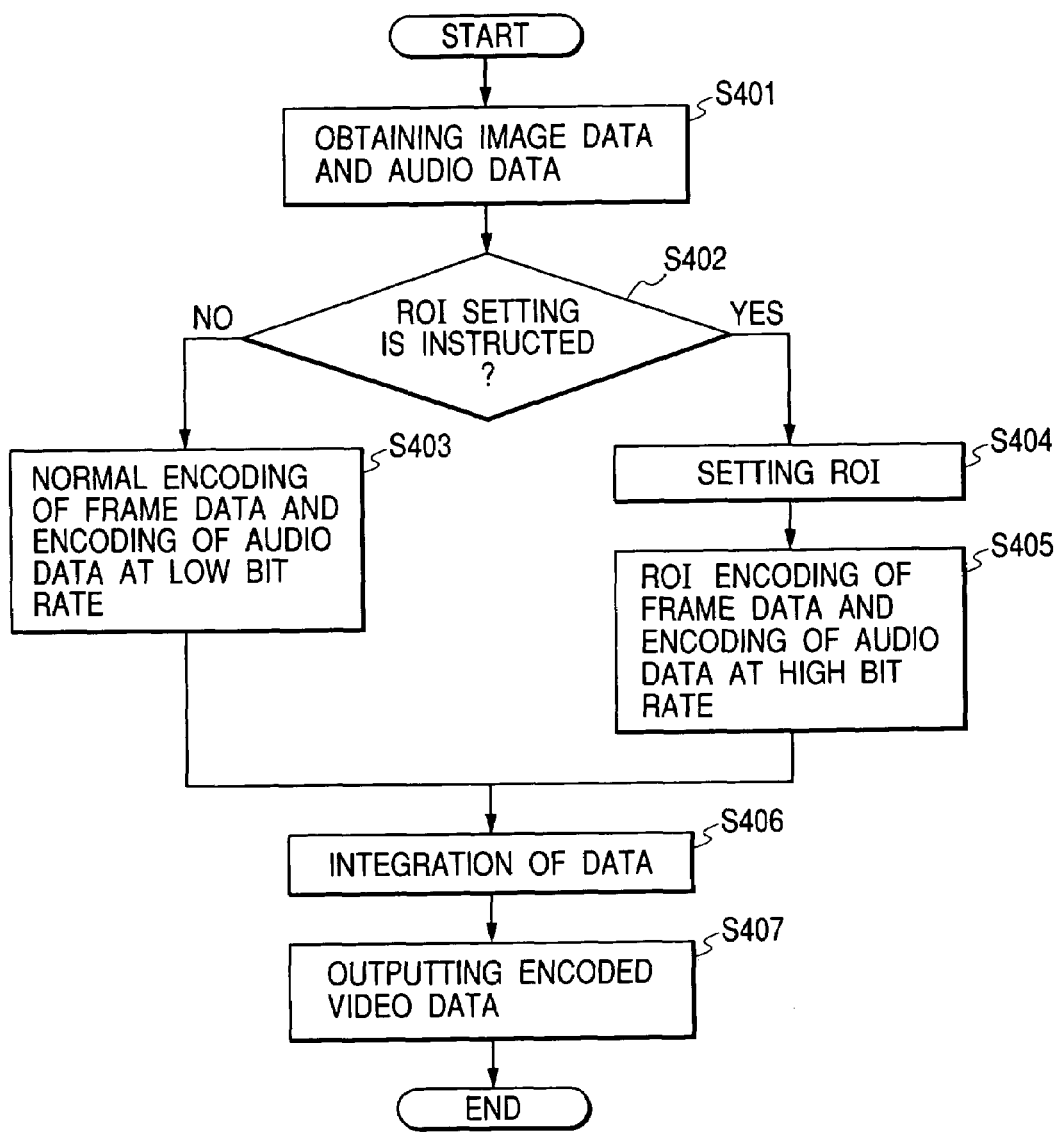
FIG. 4 is a flowchart of moving image data encoding processing executed by the image processing apparatus 200 in the first embodiment of the present invention.

FIG. 2 shows a block diagram of the image processing apparatus in the first embodiment. FIG. 4 shows a flowchart explaining an operation of this image processing apparatus.

Referring to FIG. 2, the image processing apparatus 200 is constructed of an image data obtaining unit 201, an image data encoding unit 202, an audio data obtaining unit 203, an audio data encoding unit 204, a data integration unit 205, an encoded video data output unit 206, an ROI setting instruction unit 207, an ROI setting unit 208 and a memory 209.

The discussion will be made with reference to the flowchart in FIG. 4.

To start with, the image data and the audio data are inputted respectively from the image data obtaining unit 201 and the audio data obtaining unit 203 (step S401). The image data obtaining unit 201 and the audio data obtaining unit 203 may include an image pickup apparatus such as a digital video camera, a digital still camera, etc. or an image pickup device such as a CCD (Charged Couple Device), an interface with a network line, and an external audio data input device or a microphone, etc. Alternatively, the image data obtaining unit 201 and the audio data obtaining unit 203 may include a recording medium such as a RAM (Random Access memory), a ROM (Read-Only Memory), a hard disk, a CD-ROM (Compact Disk ROM), etc., and a reproducing device thereof.

The image data obtained from the image data obtaining unit 201 are inputted on a frame-by-frame data basis to the image data encoding unit 202. The audio data obtained from the audio data obtaining unit 203 are inputted to the audio data encoding unit 204.

If a user does not give an instruction of the ROI setting from the ROI setting instruction unit 207 (No in step S402) when inputting the image data to the image data encoding unit 202, the image data are subjected to normal encoding on a frame-by-frame basis in the image data encoding unit 202, while the audio data are encoded at a low bit rate than usual in the audio data encoding unit 204 (step S402). The thus-generated encoded frame data and encoded audio data are outputted to the data integration unit 205.

While on the other hand, if the user gives the instruction of the ROI setting from the ROI setting instruction unit 207 (Yes in step S402) when inputting the image data to the image data encoding unit 202, the ROI setting unit 208 executes ROI setting so as to send to the image data encoding unit 202 information indicating which region in the frame is a target for the ROI setting, send to the audio data encoding unit 204 information indicating that the ROI setting is to be conducted, and read and write information on the ROI setting from and to the memory 209 (step S404). After this setting, the image data encoding unit 202 encodes (ROI-encodes) the inputted frame data so that the ROI-designated region is encoded with a high quality while other regions are encoded with a low quality, and further the audio data encoding unit 204 encodes the inputted audio data at a high bit rate so that the encoded audio data come to have a high audio quality (step S405). The thus-generated encoded frame data and encoded audio data are outputted to the data integration unit 205.

Figure 5:
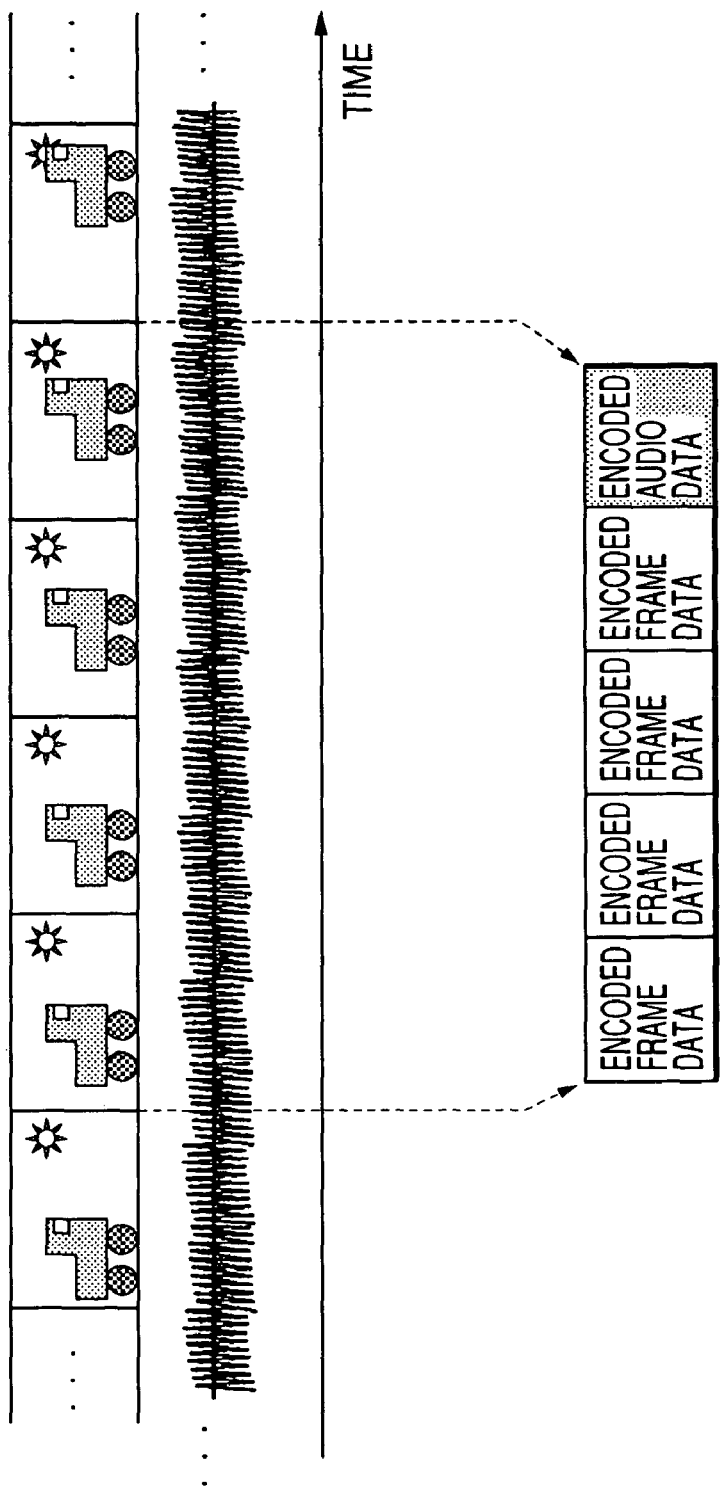
FIG. 5 is an explanatory view of a structure of moving image encoded data.
Figure 6:
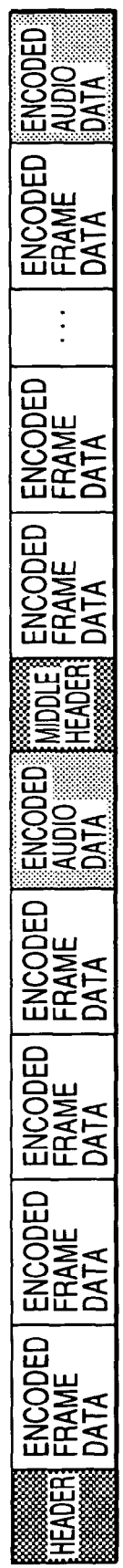
FIG. 6 is an explanatory view of a structure of the moving image encoded data.

In the data integration unit 205, upon inputs of the encoded audio data and the encoded frame data, as shown in FIG. 5, a data integration is carried out to array the encoded audio data and the encoded frame data according to a predetermined rule. Further, as shown in FIG. 6, data needed for decoding a header, etc. are inserted into predetermined positions, thereby generating encoded video data (step S406).

Thereafter, the thus-generated encoded video data are outputted to the outside from the encoded video data output unit 206 (step S407). This encoded video data output unit 206 may include an interface with a wire line, a public line, a LAN (Local Area Network), etc., through which the outputted encoded video data are transmitted to an unillustrated recording device, display device and so on.

Figure 7:
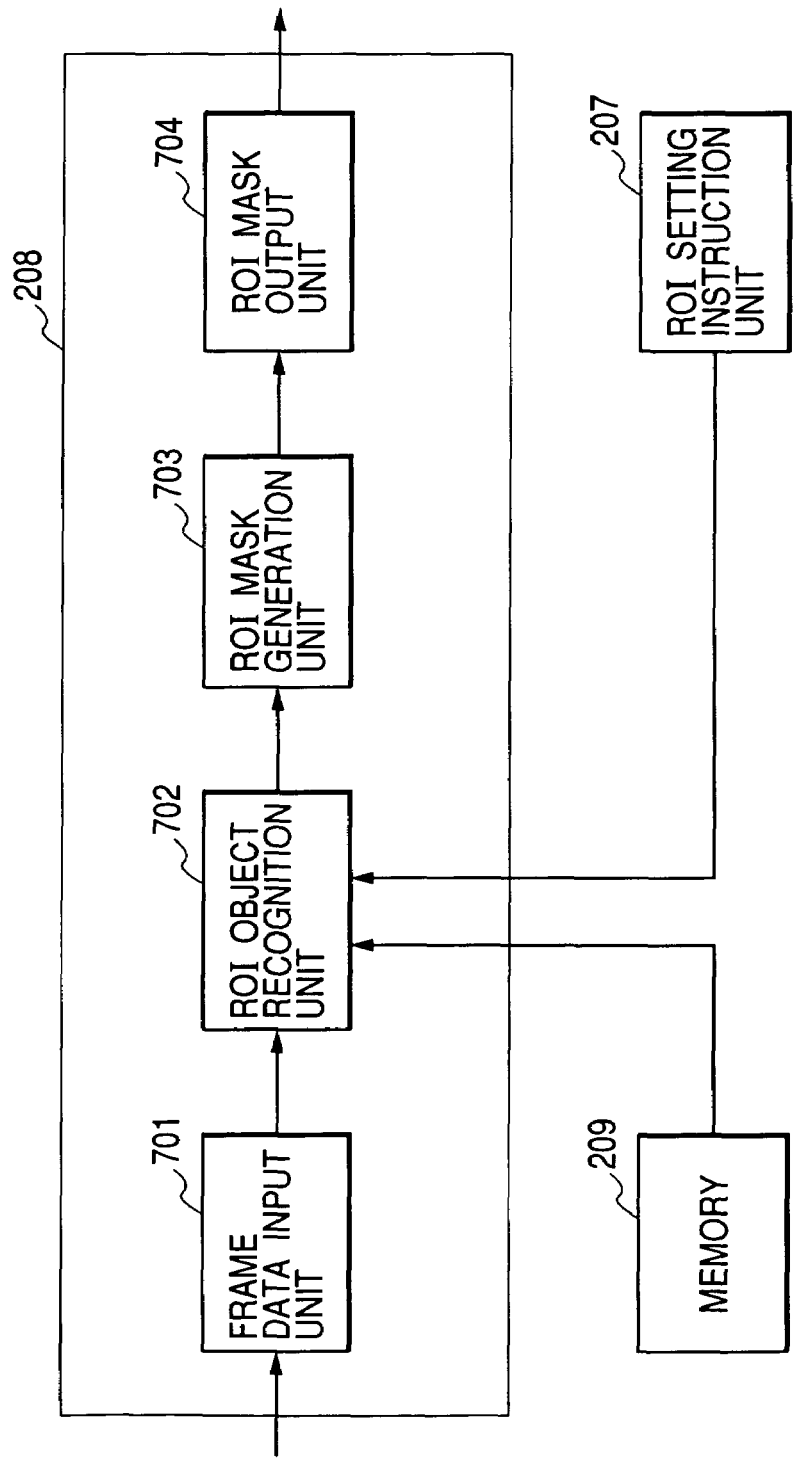
FIG. 7 is a block diagram of an ROI setting unit 208.
Figure 8:
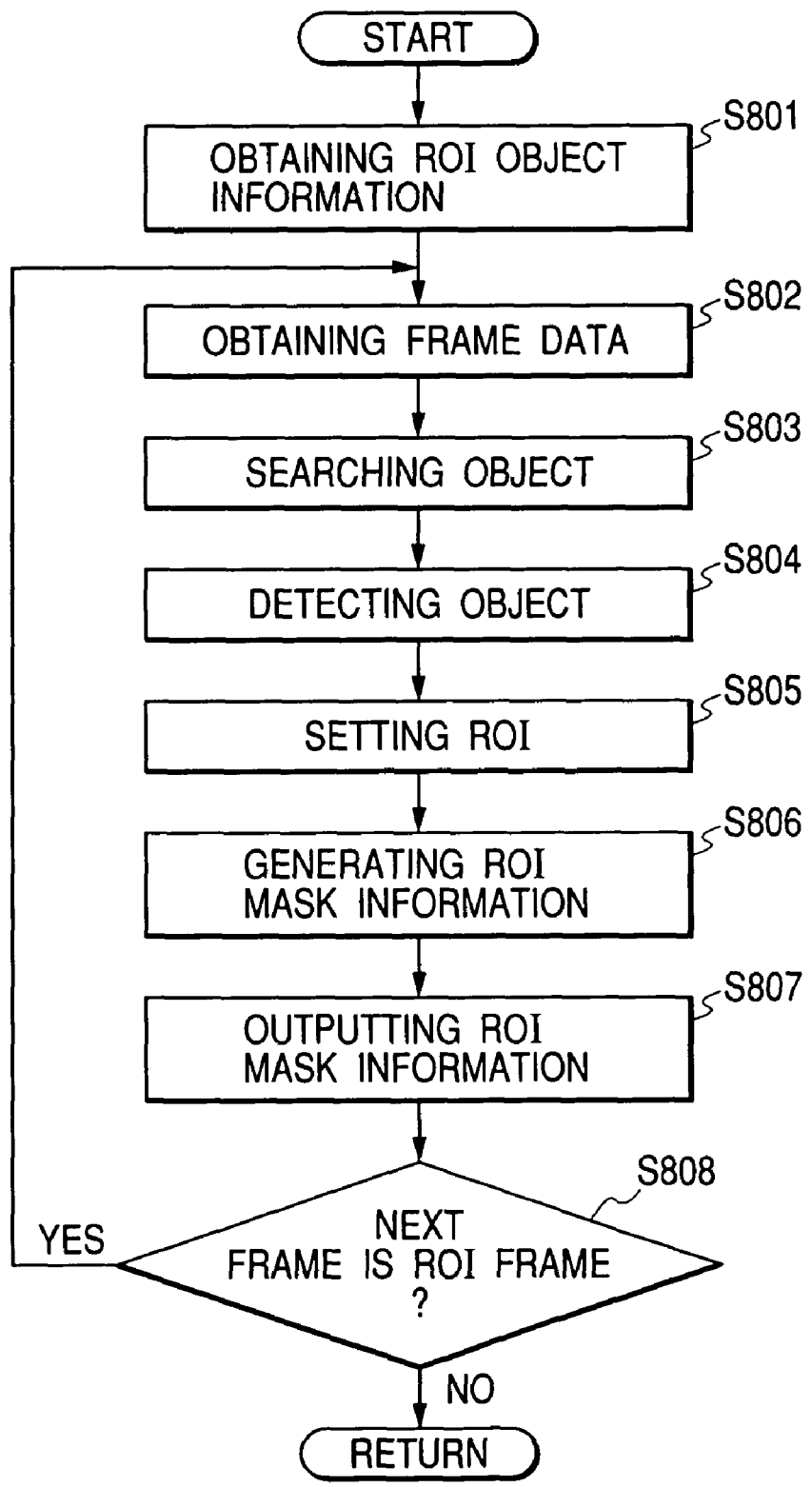
FIG. 8 is a flowchart of processing of the ROI setting unit 208.

Next, an operation of the ROI setting unit 208 will be described. FIG. 7 shows a detailed block diagram of the ROI setting unit 208, and FIG. 8 shows a flowchart of processing related to the ROI setting.

Referring to FIG. 7, the ROI setting instruction unit 207, when receiving an instruction of the ROI setting from the user, transfers this instruction to the ROI setting unit 208. The ROI setting unit 208, upon receiving the instruction transferred, obtains any item of ROI object information preset by the user (step S801).

ROI objects connote objects stored within the memory 209, and it is required that the ROI set by the user be the same as the ROI object (or the ROI should contain the ROI object).

Figure 9:
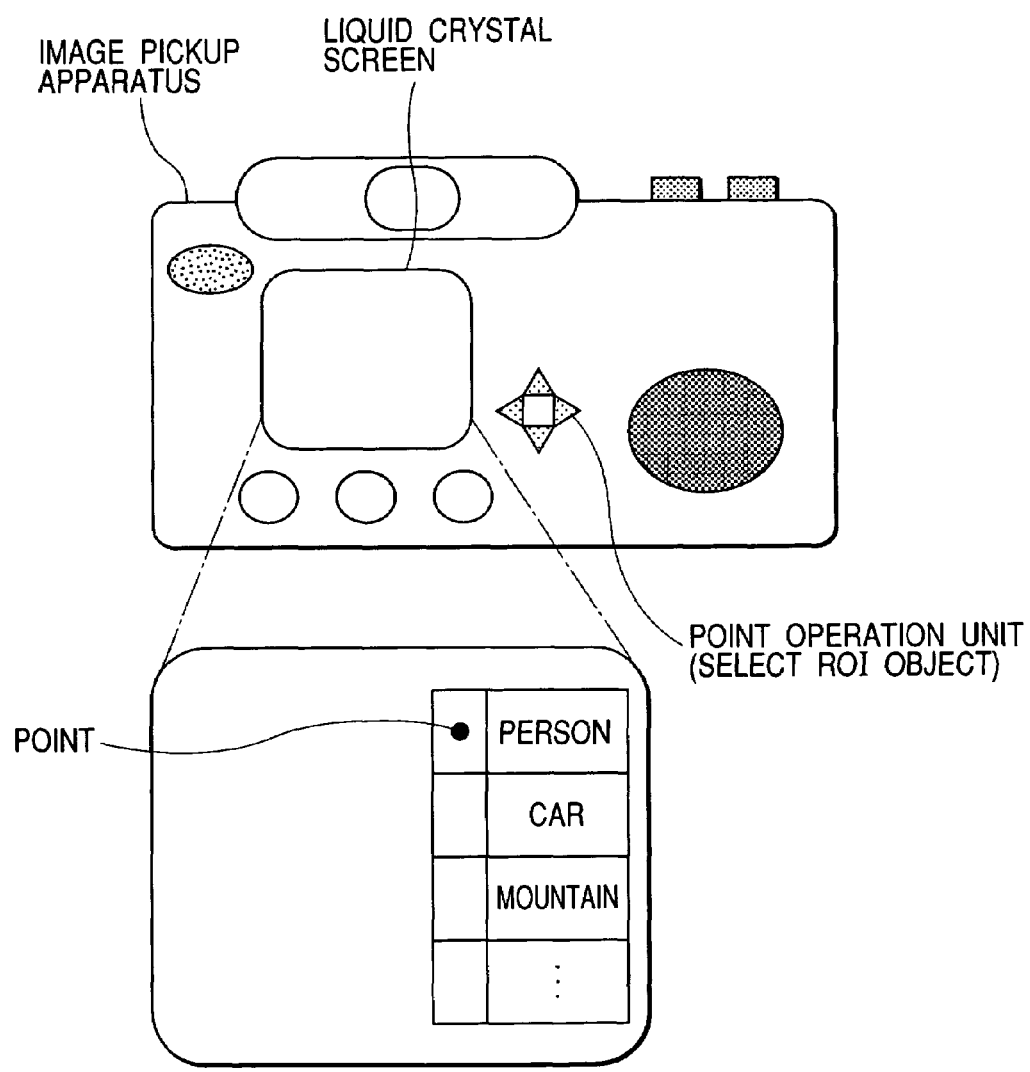
FIG. 9 is an explanatory view of a method of selecting an ROI object in a digital still camera (or a digital vide camera)

Note that as one mode of a method employed for the user to select the ROI object, there can be given a method of operating GUI (Graphical User Interface), as illustrated in FIG. 9, on a liquid crystal screen provided in an image pickup apparatus such as a digital video camera, a digital still camera, etc., which are mounted with the image processing apparatus 200. Specifically, a point movable on a menu screen displayed on the liquid crystal screen is moved and determined by a point manipulation unit, thus selecting a desired ROI object.

Figure 10:
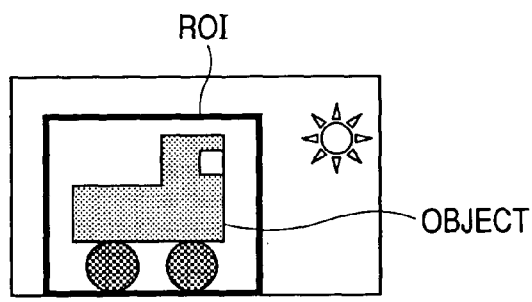
FIG. 10 is an explanatory view of. ROI and the ROI object.

Upon completion of obtaining the ROI object information, the frame data input unit 701 obtains from the image data encoding unit 202 a copy of the frame data before being encoded (step S802). Next, an ROI object recognition unit 702 searches for an object on the frame data concerned, which corresponds to the ROI object selected by the user (step S803). The ROI recognition unit 702, when the concerned object is detected through this search (step S804), as shown in FIG. 10, sets as the ROI a region that includes the detected object (step S805).

Figure 11:
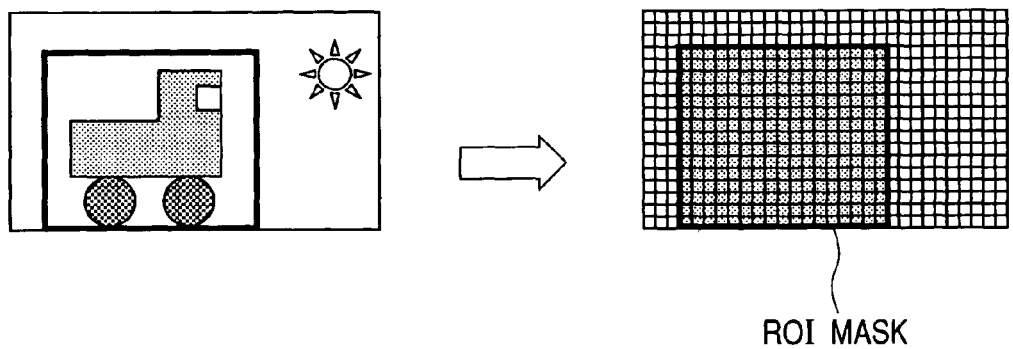
FIG. 11 is an explanatory view of an ROI mask.

Thereafter, an ROI mask generation unit 703 generates, as shown in FIG. 11, an ROI mask indicating an ROI position in the frame (step S806) and outputs ROI mask information thereof to an ROI mask output unit 704. The ROI mask output unit 704 outputs the inputted ROI mask information to the image data encoding unit 202 (step S807).

Thereafter, it is judged whether a frame to be subsequently processed is defined as an ROI frame or not (step S808). If the frame concerned is the ROI frame, the processing loops back to step S802.

Figure 12:
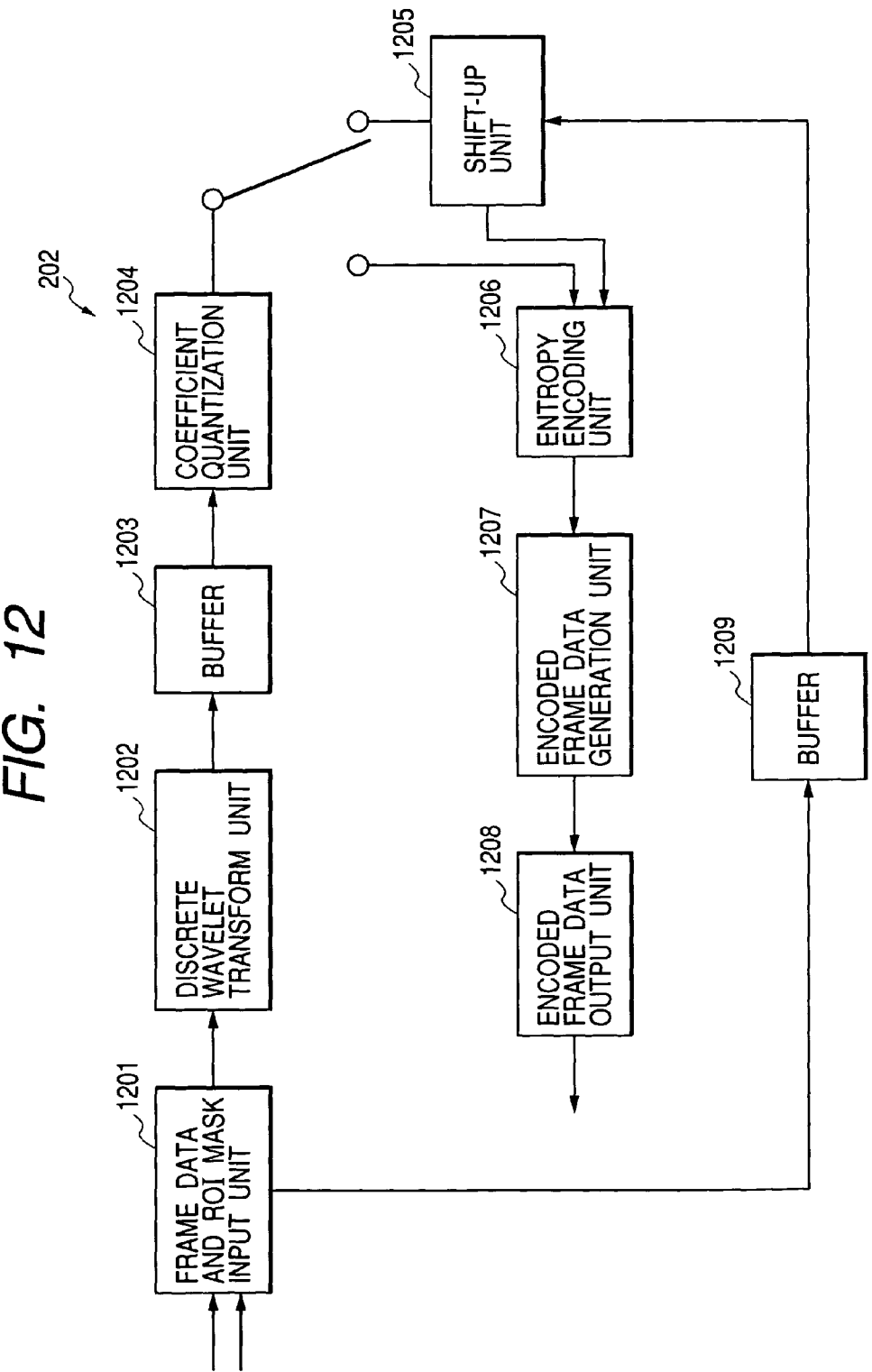
FIG. 12 is a block diagram of a frame data encoding unit 202.
Figure 13:
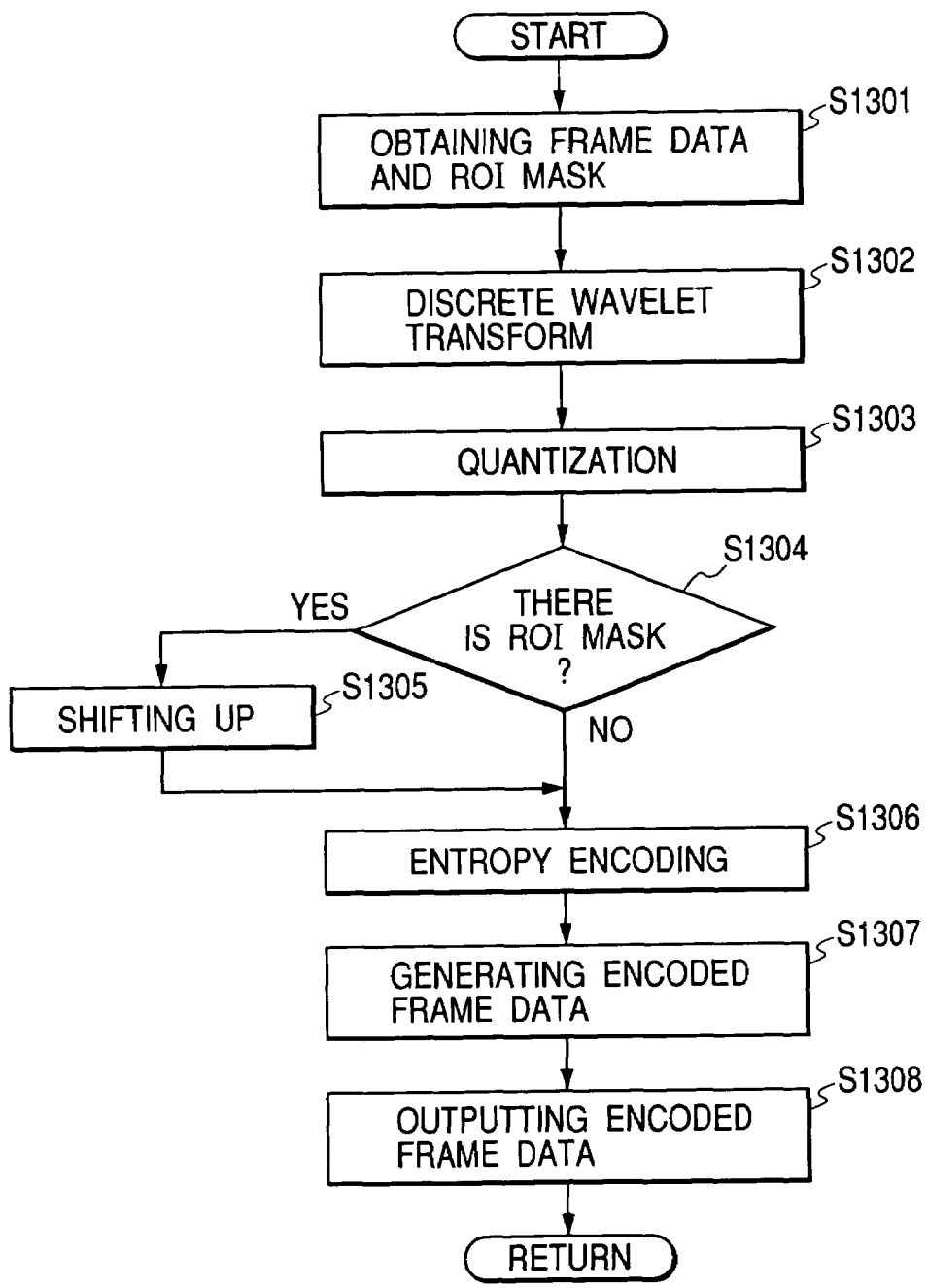
FIG. 13 is a flowchart of processing of the frame data encoding unit 202.

Next, FIG. 12 shows a detailed block diagram of the image data encoding unit 202, FIG. 13 shows a flowchart for explaining the processing operation of the image data encoding unit 202, and the processing of encoding the image data will be described in depth with reference to FIGS. 12 and 13.

It is assumed in the first embodiment that the encoding target frame data in the image be 8-bit monochrome data. The present invention can be, however, applied to a case in which the encoding target frame data are a monochrome image whose pixel is expressed by bits other than 8 bits, such as 4 bits, 10 bits, 12 bits, etc. or color multi-value frame data in which each color component (RGB/Lab/YCrCb) of each pixel is expressed in 8 bits. Further, the present invention can be applied to a case where the encoding target frame data are multi-value information representing states, etc. of the respective pixels that form the image, for instance, a case where the encoding target frame data is a multi-value index value representing a color of each pixel. In the case of being applied to these cases, each category of multi-value information may be set as the monochrome frame data which will be explained later on.

To begin with, pixel data of the encoding target frame data are inputted in a sequence of a raster scan to a frame data/ROI mask input unit 1201 from the image data obtaining unit 201 and then outputted to a discrete wavelet transform unit 1202. Further, if the ROI setting unit 208 is generating the ROI mask corresponding to the frame concerned, the ROI mask information is inputted to the frame data/ROI mask input unit 1201 and outputted therefrom to a buffer 1209 (step S1301).

The discrete wavelet transform unit 1202 performs a discrete wavelet transform by use of data (reference pixel data) of a plurality of pixels (reference pixels) in one set of tile data x(n) existing in one still image inputted from the frame data/ROI mask input unit 1201 (step S1302).

Frame data (discrete wavelet transform coefficient) after the discrete wavelet transform has been done, are given as follows:

$$Y(2n)=X(2n)+\text{floor}\{(Y(2n-1)+Y(2n+1)+2)/4\}$$

$$Y(2n+1)=X(2n+1)-\text{floor}\{(X(2n)+X(2n+2))/2\}$$

where Y(2n) and Y(2n+1) is a discrete wavelet transform coefficient train, the former is a low frequency sub-band and the latter is a high frequency sub-band. Further, in the formulae given above, floor{X} represents a maximum integer value that does not exceed X. FIG. 14 shows a schematic representation of this discrete wavelet transform.

These transform formulae are formulated for the one-dimensional data, however, a two-dimensional transform is effected by applying this transform to a horizontal direction and a vertical direction in this sequence, thereby enabling a division into four sub-bands of LL, HL, LH and HH as shown in FIG. 15A. Herein, L represents a low frequency sub-band, and H denotes a high frequency sub-band. FIG. 15B shows a case in which the LL sub-band is further divided likewise into four sub-bands, and FIG. 15C shows a case in which an LL sub-band among these divided sub-bands is further divided into four sub-bands, whereby totally ten sub-bands are created. The ten sub-bands shall be respectively called HH1, HL1, . . . as shown in FIG. 15C. Herein, the numerals suffixed to the names of the respective sub-bands shall be levels of these individual sub-bands. Namely, the sub-bands having a level "1" are HL1, HH1, LH1, the sub-bands having a level "2" are HL2, HH2, LH2, and the sub-bands having a level "3" are HL3, HH3, LH3. Note that the LL sub-band shall be a sub-band having a level "0". The LL sub-band is only one and is therefore attached with no suffix. Further, decoded images obtained by decoding the sub-bands having the level "0" through the level "n" are referred to as level-n decoded images. The decoded images exhibit higher resolutions as they have higher levels.

With a mechanism described above, the transform coefficients of the ten sub-bands generated by the discrete wavelet transform unit 1202 are temporarily stored (buffered) in the buffer 1203 and then outputted to a coefficient quantization unit 1204 in this order of LL, HL1, LH1, HH1, HL2, LH2, HH2, HL2, LH3, HH3, i.e., in the order of the sub-band level from the lowest up to the highest.

The coefficient quantization unit 1204 quantizes the transform coefficient of each sub-band that is outputted from the buffer 1203, with a quantization step determined for every frequency component, and generates a value after being quantized (which is called a coefficient quantized value) (step S1303). Let "X" be a coefficient value and "q" be a value of the quantization step with respect to the frequency component belonging to this coefficient, and a coefficient value Q(X) after being quantized shall be acquired by the following formula:

$$Q(X)=\text{floor}\{(X/q)+0.5\}$$

FIG. 16 shows mappings (correspondences) of the respective frequency components to the quantization steps. As shown in FIG. 16, a larger quantization step is assigned to the sub-band having a higher level. Note that the quantization steps of the respective sub-bands are to be stored beforehand in the memory such as the unillustrated RAM, ROM, etc.

Then, the coefficient quantization unit 1204, in case the ROI mask information corresponding to the frame data that is now being processed exists in the buffer 1209 (Yes in step S1304), outputs those coefficient quantized values to a shift-up unit 1205. Moreover, if the ROI mask attached to the frame data concerned does not exist in the buffer 1209 (No in step S1304), those coefficient quantized values are outputted to an entropy coding unit 1206.

The shift-up unit 1205 changes (shifts up), based on the following formulae, the coefficient quantized values so that an ROI image quality in the corresponding frame becomes higher than a non-ROI image quality in accordance with the ROI mask information stored in the buffer 1209 (step S1305).

$Q'=Q*2^B$ (Q: an absolute value of the coefficient quantized value existing within the ROI)

$Q'=Q$ (Q: an absolute value of the coefficient quantized value existing outside the ROI)

where B is a value given to each sub-band, and each Q' is set larger than every Q" to be given in subjected sub-band.

Through the processing described above, only the coefficient quantized value belonging to a space area designated in the shift-up unit 1205, is shifted up by B bits.

Figure 17A:
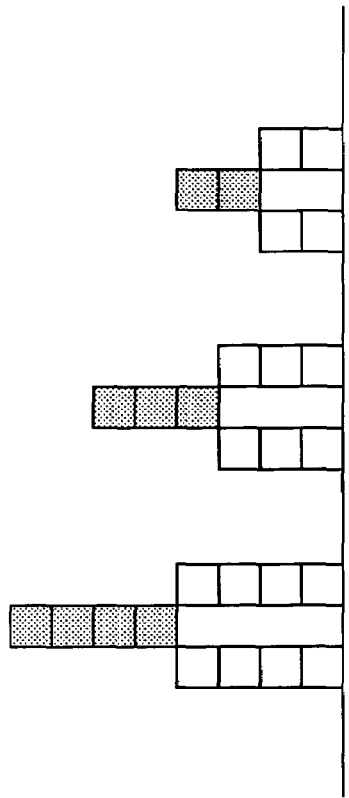
FIGS. 17A, 17B and 17C are explanatory views of the ROI and the non-ROI in each sub-band.
Figure 17B:
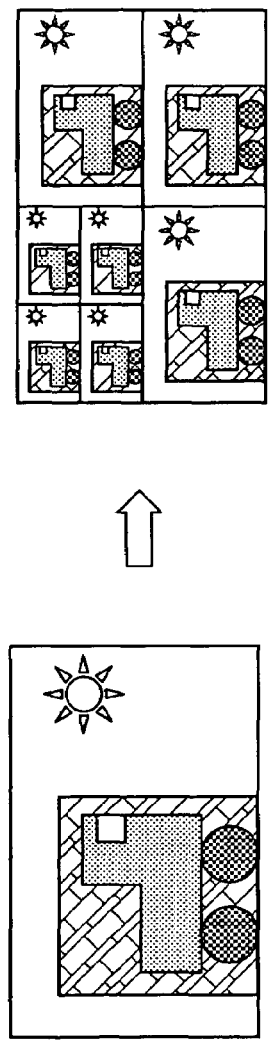
Figure 17C:
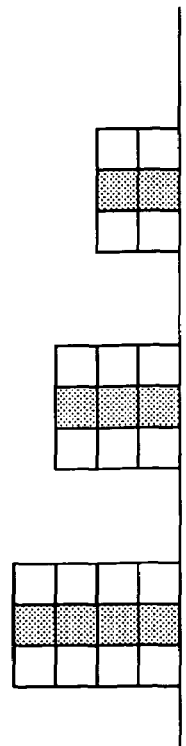

FIG. 17A shows the ROI and the non-ROI in each sub-band. FIGS. 17B and 17C show changes in the coefficient quantized value due to the shift-up. In FIG. 17B, three coefficient quantized values exist in each of three sub-bands, and the coefficient quantized values with half-tone meshing are coefficient quantized values of the ROI and appear as shown in FIG. 17C after being shifted up.

The coefficient quantized values subjected to the processing described above are outputted to the entropy encoding unit 1206.

Figure 18:
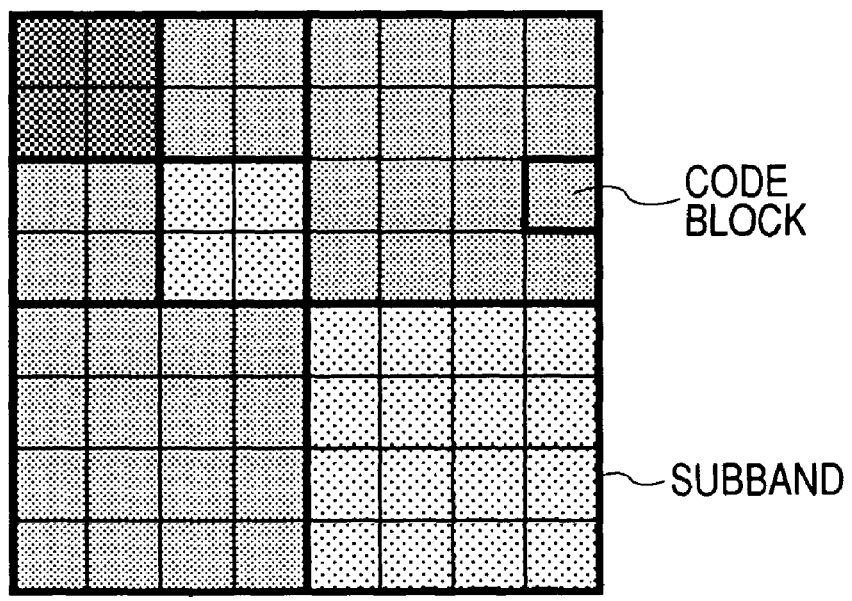
FIG. 18 is an explanatory view of a division of a code block.

The entropy encoding unit 1206 effects entropy-encoding of the inputted coefficient quantized values (step S1306). Herein, at first, as shown in FIG. 18, each sub-band defined as an aggregation of the inputted coefficient quantized values is divided into rectangles (which are called code blocks) Note that a size of this code block is set such as 2m×2n (m, n are integers each larger than 2) and so on.

Figure 19:
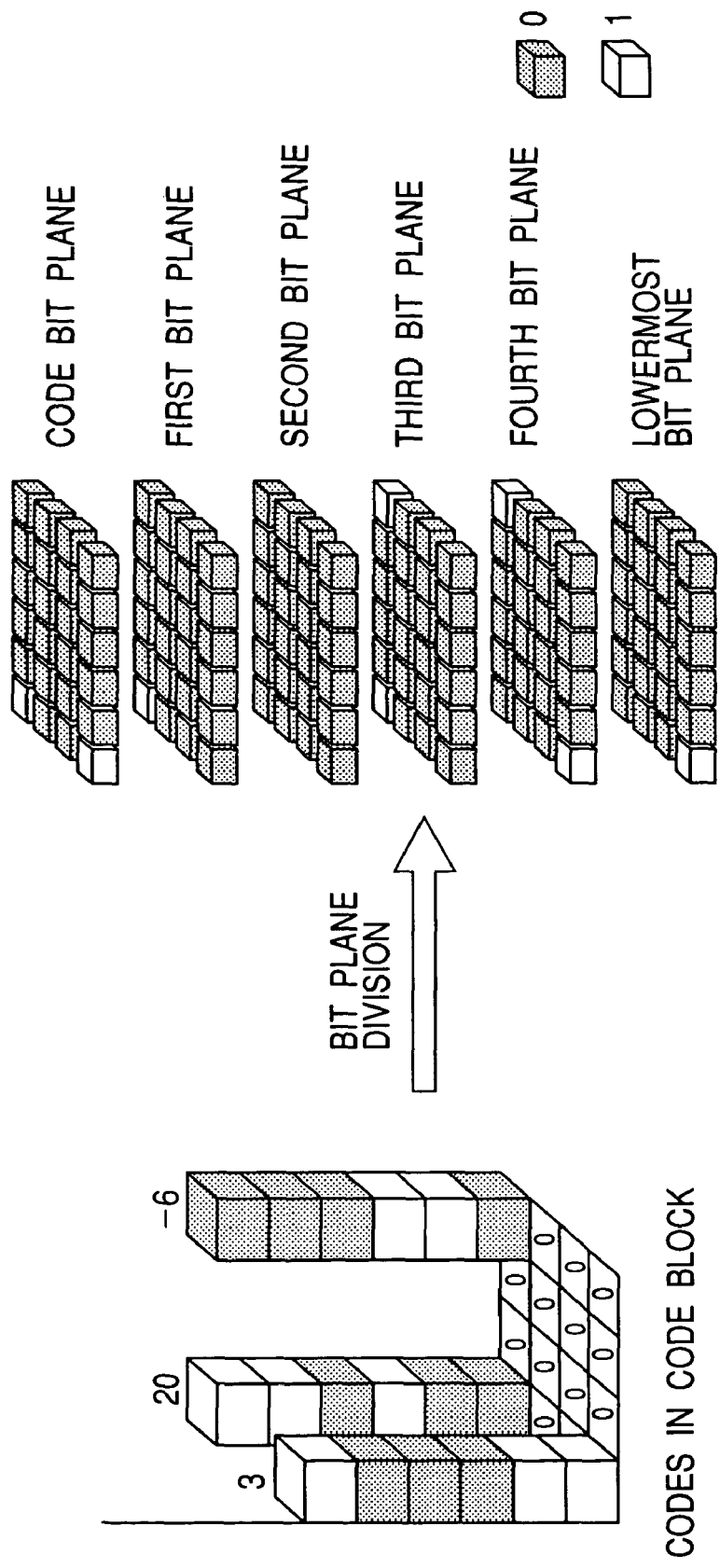
FIG. 19 is an explanatory view of bit plane slicing.
Figure 20:
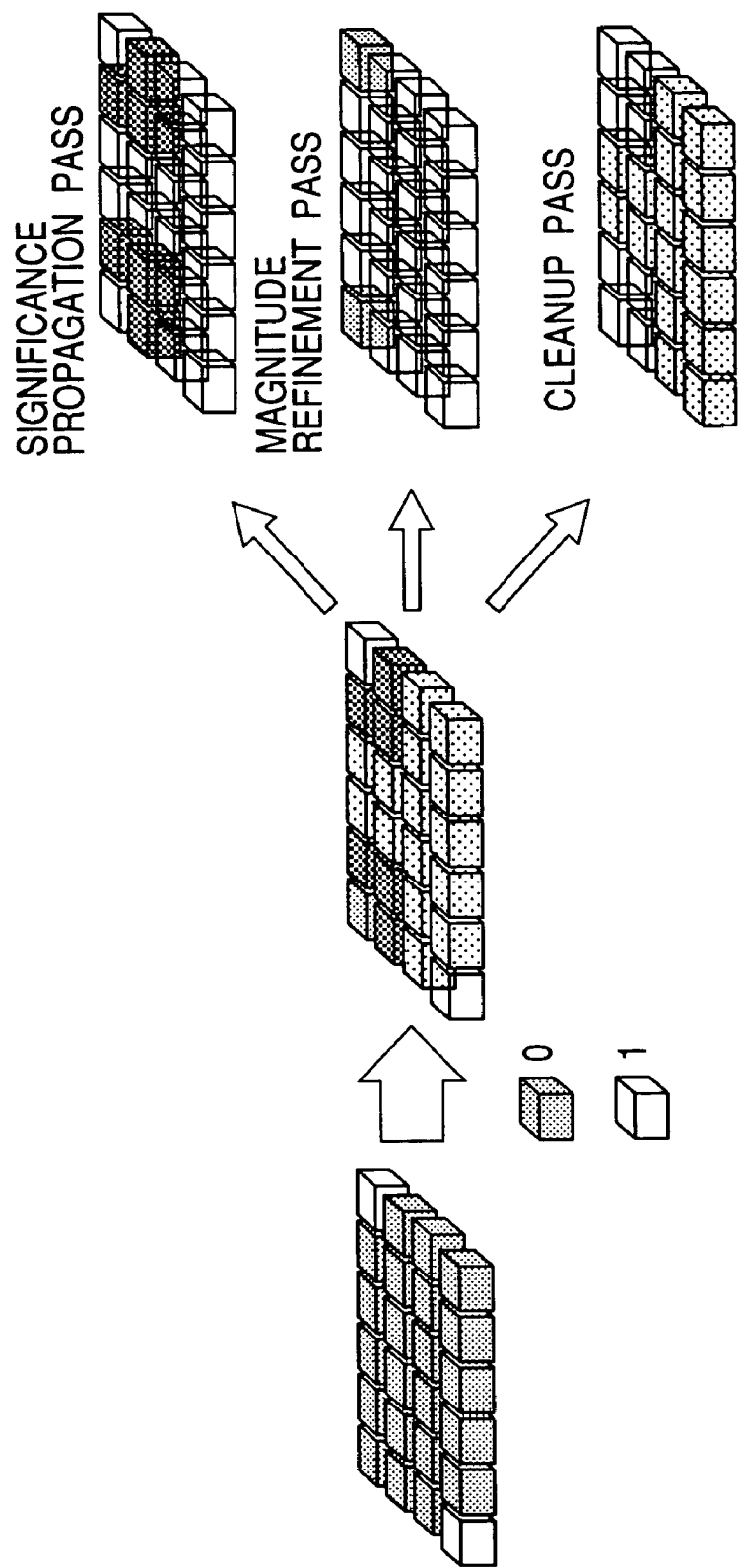
FIG. 20 is an explanatory view of a coding pass.

Further, this code block is, as shown in FIG. 19, further divided (sliced) into bit planes. After this slicing into the bit planes, as illustrated in FIG. 20, the respective bits in a certain bit plane are classified into three types on the basis of a given classification rule, and three categories of coding passes are each generated by aggregating the same type of bits. The inputted coefficient quantized values are subjected to binary arithmetic encoding defined as the entropy encoding on a unit basis of the coding pass obtained herein, thereby generating entropy-encoded values.

Note that a specific processing order of the entropy encoding is herein such that the encoding is, as for one code block, conducted in the sequence from the upper bit plane to the lower bit plane, and, as for a certain bit plane of one code block, the three categories of passes in FIG. 20 are to be encoded in the sequence from the uppermost pass.

The coding passes, which have been entropy-encoded as described above, are outputted to a frame encoded data generation unit 1207.

The frame encoded data generation unit 1207 constructs a single or a plurality of layers from the plurality of coding passes inputted, and generates frame encoded data, wherein the layer is used as a data unit (step S1307). The following is an explanation about a layer structure.

Figure 21:
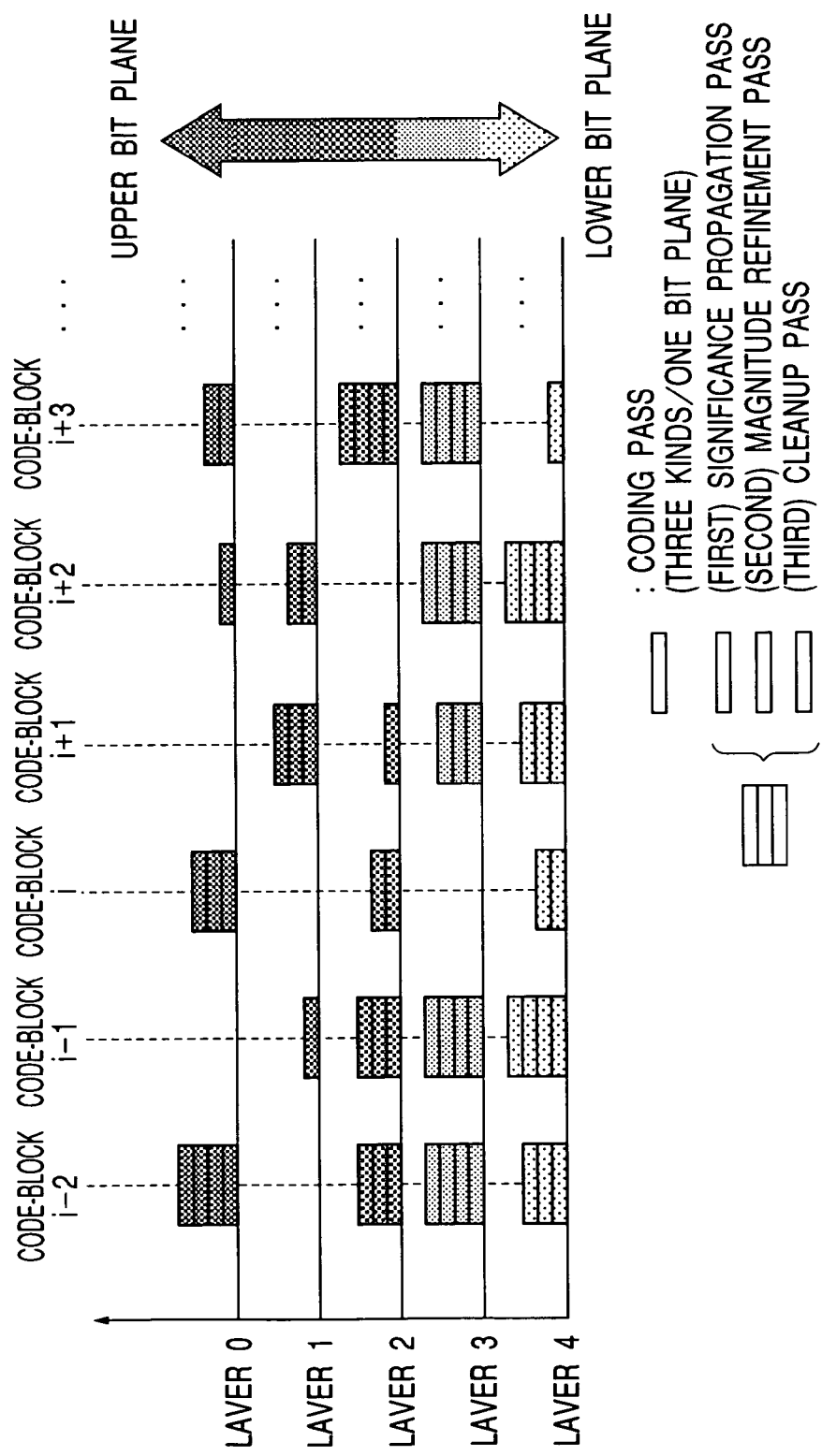
FIG. 21 is an explanatory view of a generation of layers.
Figure 22:
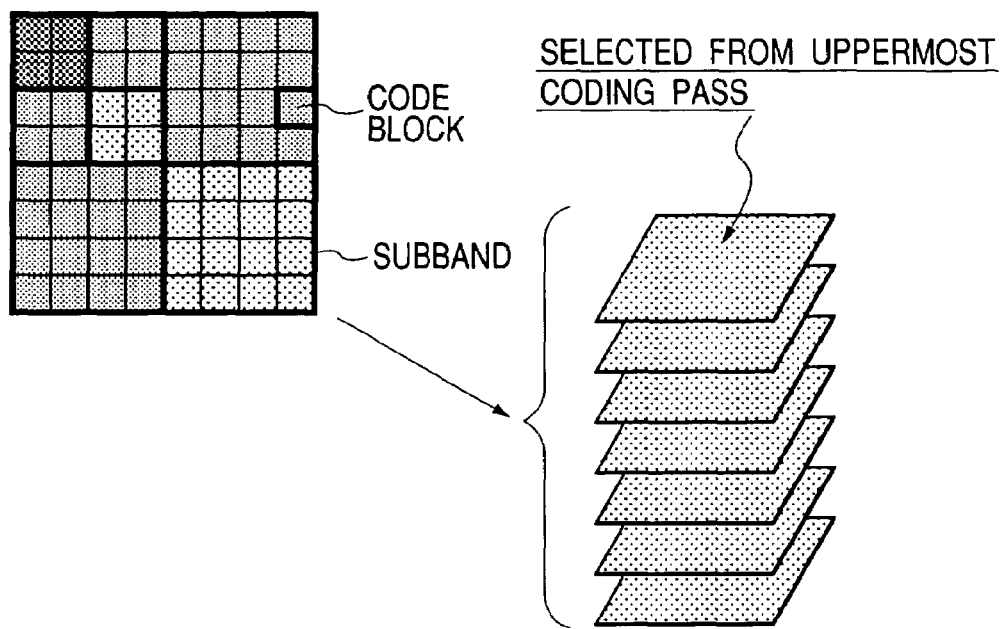
FIG. 22 is an explanatory view of the generation of layers.

This processing unit, as shown in FIG. 21, gathers the entropy-encoded coding passes from the plurality of code blocks in the plurality of sub-bands, and thus constructs the layers. Note that when obtaining the coding passes from a certain code block, the coding pass existing at the highest-order in the code block concerned is invariably selected as illustrated in FIG. 22.

Figure 23:
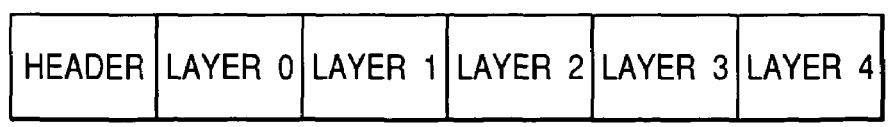
FIG. 23 is an explanatory view of a structure of encoded frame data.

Thereafter, the frame encoded data generation unit 1207, as in an example in FIG. 23, arranges the generated layers in the sequence of their positions from the uppermost to the lowermost, and adds a header to the head of the frame to generate the frame encoded data. This header is stored with information for identifying the frame, a code length of the frame encoded data concerned, a lengthwise/crosswise size of the input frame, a variety of parameters used for compression, etc.

The thus generated frame encoded data are outputted to a next processing circuit via a frame encoded data output unit 1208 (step S1308).

What has been given so far is the detailed explanation of the image data encoding unit 202.

Figure 24:
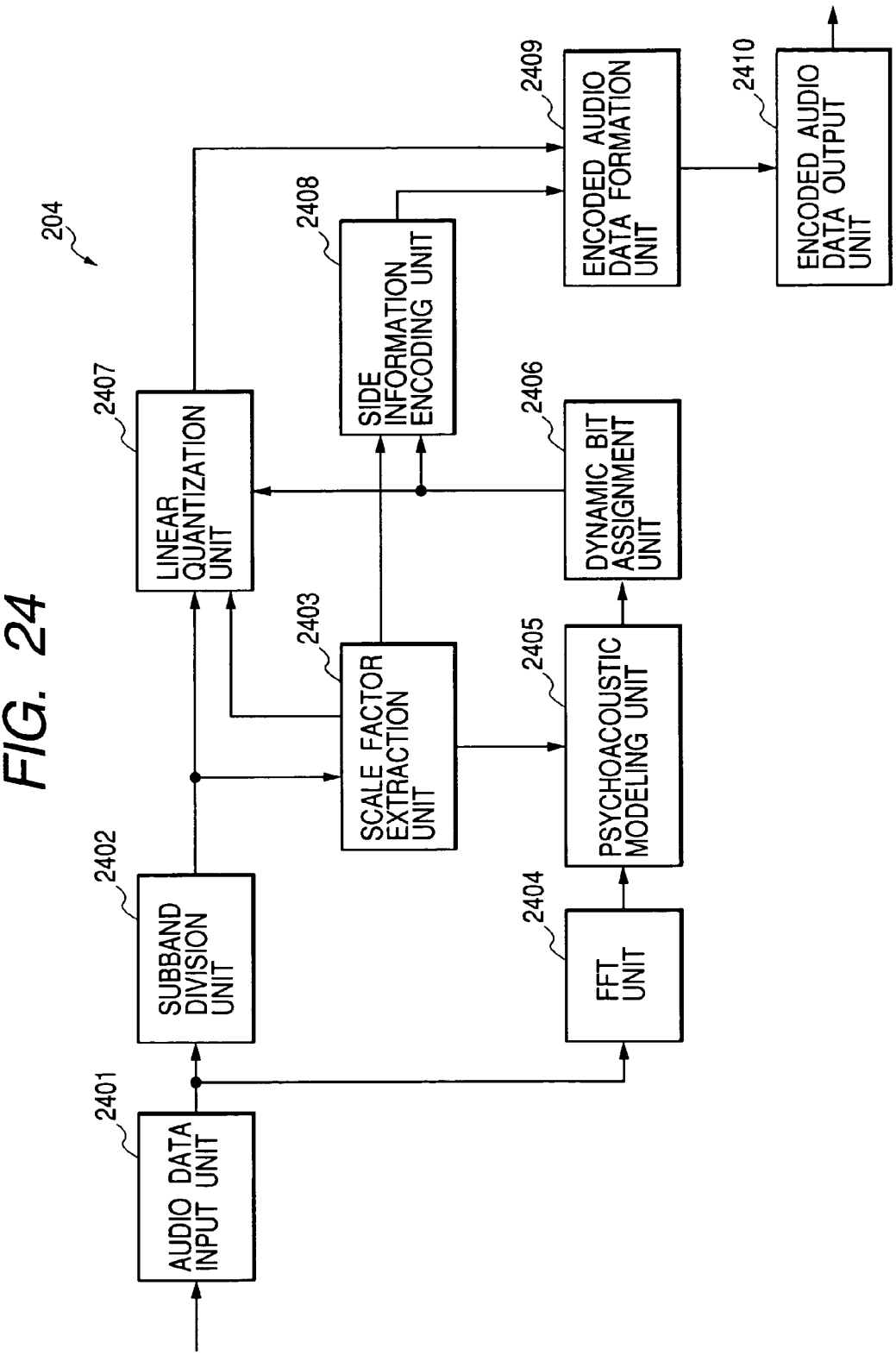
FIG. 24 is a block diagram of an audio data encoding unit 204.
Figure 25:
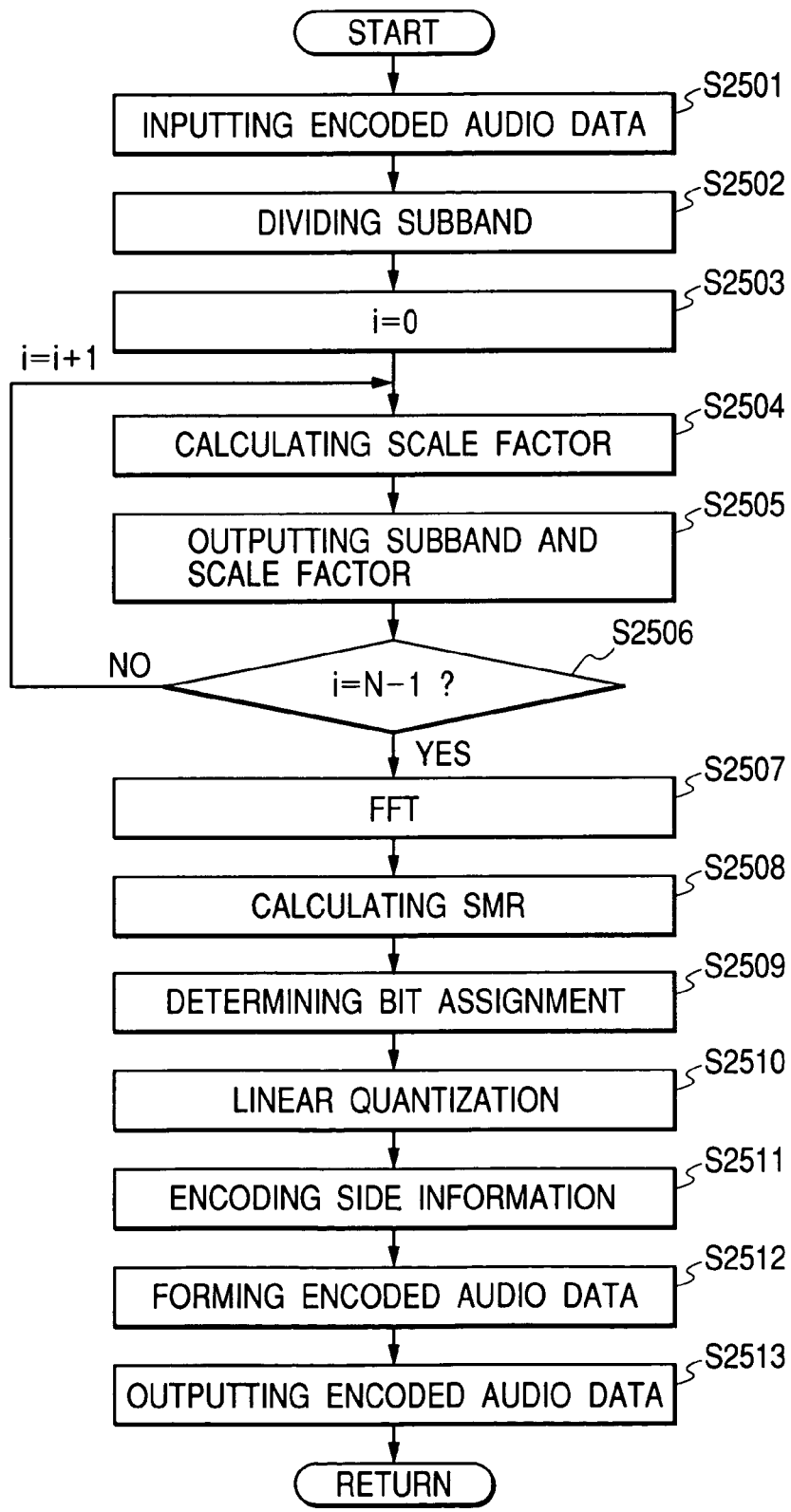
FIG. 25 is a flowchart of processing of the audio data encoding unit 204.

Next, FIG. 24 shows a detailed block diagram of the audio data encoding unit 204, FIG. 25 is a flowchart for explaining the processing operation of the audio data encoding unit 204 concerned, and the audio data encoding process will be described in detail with reference to FIGS. 24 and 25.

To start with, the inputted audio data, which have been linearly quantized by 16 bits, are inputted to an audio data input unit 2401 (step S2501) and outputted to a sub-band division unit 2402 and a fast Fourier transform unit (FFT unit) 2404.

The sub-band division unit 2402 divides the inputted audio data into 32 sub-bands through 512-tap PFBs (Polyphase Filter Banks) (step S2502). A sub-band division procedure is shown as below.

To being with, for 512 input signal samples $x_0, \ldots, X511$, a calculation is made as follows:

$Z_i = C_i \times X_i$

Herein, what is defined in a table in ISO/IEC11172-3 is considered as one model of Ci.

Next, the following calculation is made:

$$Y_i = \sum_{j=0}^{7} Z_{64j+i}$$

and, the sub-band output $S_i$ is calculated based on the following formula:

$$S_i = \sum_{k=0}^{63} Y_k * \cos\frac{(2i-i)(k-16)\pi}{64}$$

Note that the number of the sub-bands to be generated is assumed to be "N" in the first embodiment.

Next, the audio data encoding unit 204 sets a value of an unillustrated counter i to i=0 (step S2503) and makes a scale factor extraction unit 2403 execute calculating a scale factor of each sub-band (step S2504). This scale factor is extracted in the way that follows.

At first, a sample of a maximum absolute value is searched for, wherein twelve samples are set as one block in every sub-band. Further, a minimum value larger than the maximum absolute value of the sample is selected from a predetermined scale factor table, and this value is set as a scale factor.

The scale factor obtained herein is outputted to a linear quantization unit 2407, a side information encoding unit 2408 and a psychoacoustic modeling unit 2405. Further, the sub-band with the necessary scale factor extracted is outputted to the linear quantization unit 2407 (step S2505).

If the value of the unillustrated counter i does not satisfy i=N−1, i is incremented, and thereafter the processing is returned to the steps before step S2504. If i=N−1, the processing proceeds to step S2507 (step S2506).

An audio signal inputted to the FFT unit 2404 is divided into M blocks, wherein 512 samples are set as one block. Thereafter, the fast Fourier transform (FFT) is executed for each block (step S2507). A coefficient value of each block generated is outputted to the psychoacoustic modeling unit 2405.

The psychoacoustic modeling unit 2405 calculates a signal-to-mask ratio (SMR) on the basis of the inputted coefficient value and the scale factor (step S2508). This calculated SMR is outputted to a dynamic bit assignment unit 2406. Note that this SMR is given as a ratio of an acoustic pressure of each sub-band and a minimum masking level. The method of drawing this SMR is well known, and hence its explanation is herein omitted.

The dynamic bit assignment unit 2406 calculates and determines a bit amount assigned to each sub-band (step S2509). This calculation method will hereinafter be explained referring to a flowchart in FIG. 26.

To begin with, the samples of the respective sub-bands are inputted (step S2601). Next, there is calculated an assignable bit amount obtained by subtracting from a total utilizable bit rate, a bit amount necessary for the header and the data utilized by the user as the user intends, the data needed for an error correction, and so forth (step S2602).

Next, a bit amount assigned to each sub-band is calculated by setting the quantization step for each sub-band on the basis of the assignable bit amount using a signal-to-noise ratio (SNR) and an MNR (mask-to-noise ratio) (step S2603). The method of drawing this assignable bit amount is introduced in a variety of literatures, and therefore the explanation about this method is omitted.

Thereafter, the quantization step for each sub-band to which the bit amount is assigned, is outputted to the linear quantization unit 240 and to the side information encoding unit 2408 (step S2604).

Note that in the first embodiment, the dynamic bit assignment unit 2406 assigns the utilizable total bits so that an amount of codes of the audio encoded data outputted during the ROI setting period becomes larger than an amount of codes of the audio encoded data outputted during the ROI non-setting period. This makes it possible to differentiate between an acoustic quality of the audio data generated during the ROI setting period and that of the audio data generated during the ROI non-setting period.

Figure 26:
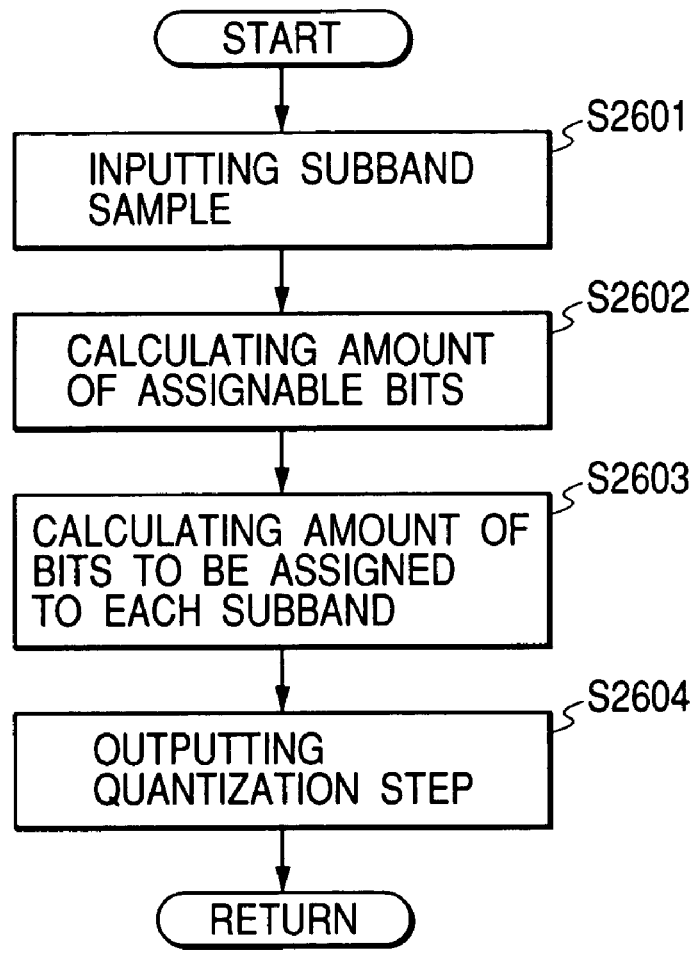
FIG. 26 is a flowchart of processing of a dynamic bit assignment unit 2406.

As discussed so far referring to FIG. 26, when the dynamic bit assignment determining unit 2406 determined the bit amount assigned to each sub-band and also the quantization step, the linear quantization unit 2407 executes the quantization based on the quantization step concerned (step S2510). The quantized sub-band sample obtained herein is outputted to the encoded audio data formation unit 2409. Further, the side information encoding unit 2408 encodes the inputted scale factor and the quantization step information (step S2511), and outputs them to the encoded audio data formation unit 2409.

Figure 27:
FIG. 27 is an explanatory view of a structure of encoded audio data.

The encoded audio data formation unit 2409 forms encoded audio data from, as shown in FIG. 27, the header, the sub-band sample and ancillary data (which can be arbitrarily utilized by the user) (step S2512), and outputs them to an encoded audio data output unit 2410. Note that the header is stored with information such as side information, sampling frequencies, etc. that are needed for decoding the encoded audio data concerned.

The encoded audio data output unit 2410 output the encoded audio data to a data integration unit 205 (step S2513).

As mentioned above, the first embodiment enables the audio data to be encoded with the high acoustic quality by changing the bit rate (the amount of assignment bits) during the ROI setting period defined as a period of time significant to a photographer.

Second Embodiment

Next, a second embodiment will be discussed.

In the image processing apparatus in the first embodiment, the differentiation between the decoded sound qualities of the audio data generated during the ROI setting period and the ROI non-setting period, is attained by changing the bit rate. According to a second embodiment, the differentiation between the decoded acoustic qualities is attained based on whether the compression is executed or not.

Figure 31:
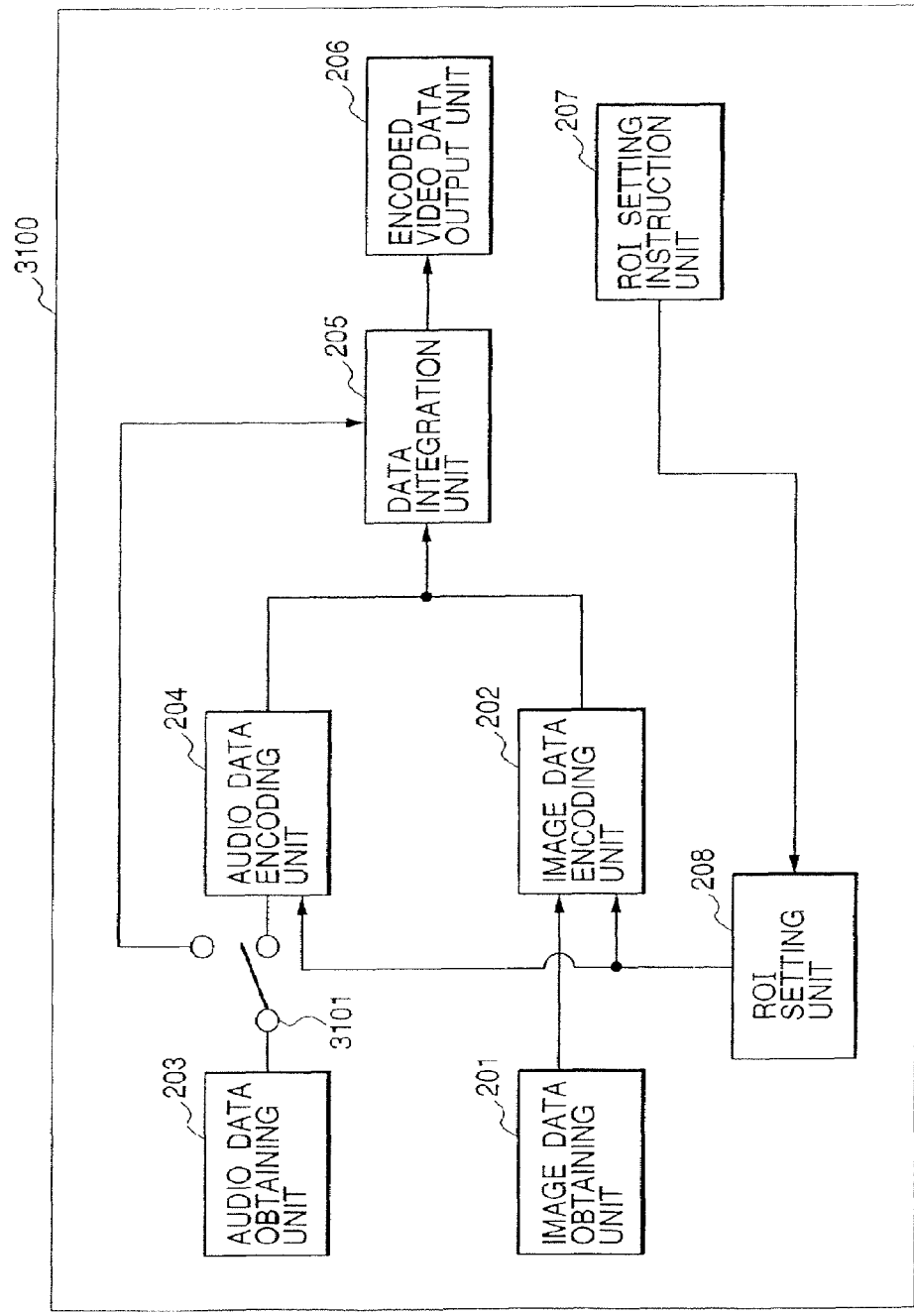
FIG. 31 is a block diagram of an image processing apparatus 3100 in a second embodiment of the present invention.

FIG. 31 shows a block diagram of an image processing apparatus 3100 in the second embodiment. This image processing apparatus 3100 is constructed by adding, to the image processing apparatus 200 in the first embodiment, a switch 3101 provided posterior to the audio data obtaining unit 203 and a path extending from the switch 3101 to the data integration unit 205.

This switch 3101 is, though normally connected to the audio data encoding unit 204, connected to the route that bypasses the audio data encoding unit 204 when a photographer inputs an instruction of the ROI setting through the ROI setting instruction unit 207. This contrivance actualizes (a mechanism of) whether the compression encoding of the audio data should be done or not.

As described above, the second embodiment has exemplified the method of differentiating between the acoustic qualities of the decoded audio data generated in the two periods of times by compressing the audio data generated during the ROI non-setting period and by effecting no compression of the audio data generated during the ROI setting period.

Third Embodiment

Next, a third embodiment will be explained.

Figure 28:
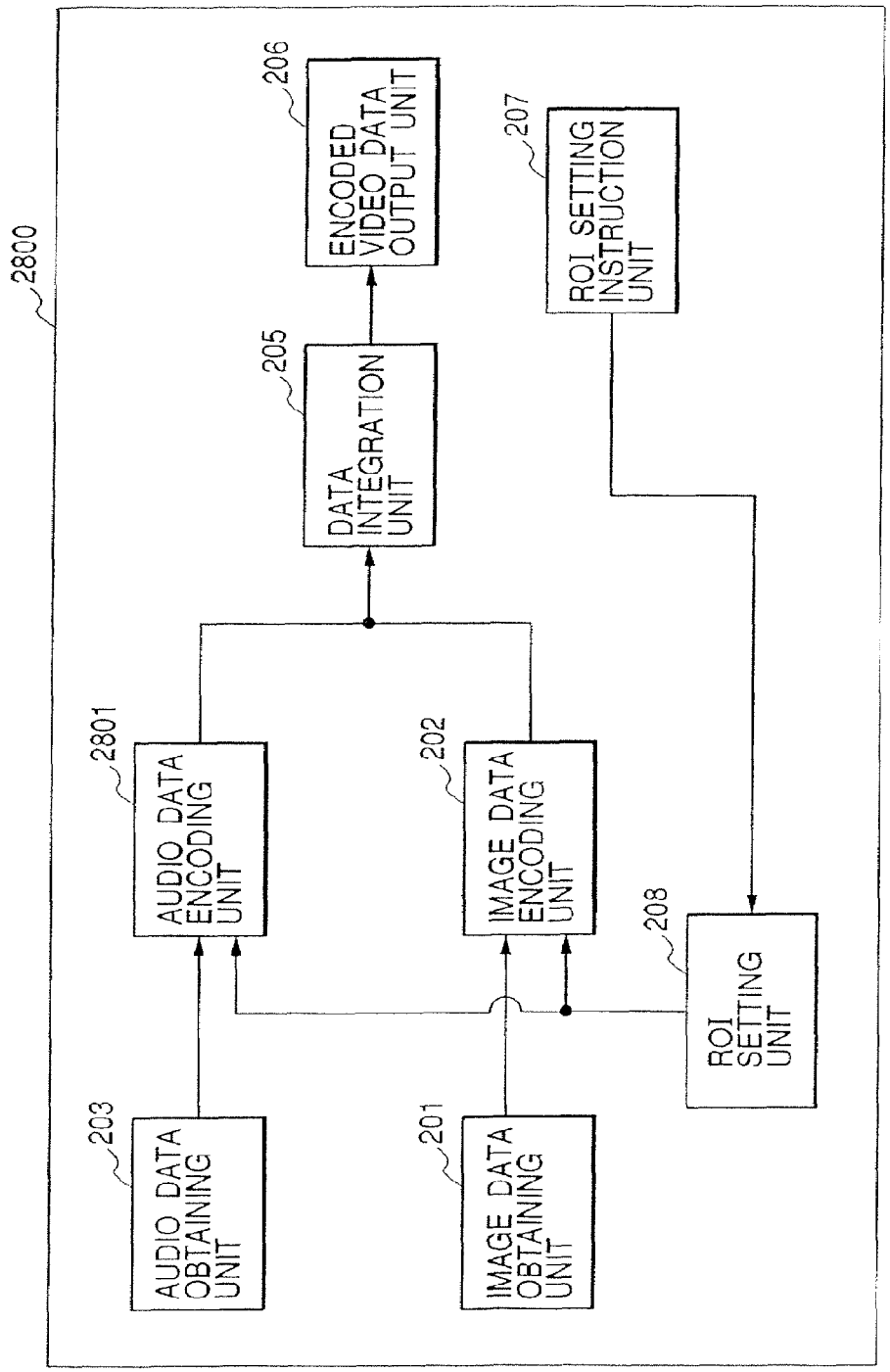
FIG. 28 is a block diagram of an image processing apparatus 2800 in a third embodiment of the present invention.

FIG. 28 shows a configuration of an image processing apparatus 2800 of the third embodiment. In the image processing apparatus 2800 in FIG. 28, the blocks denoted with the same numerals as those in the image processing apparatus 200 in FIG. 2 are the same as the blocks shown in FIG. 2, and hence their explanations are herein omitted. The image processing apparatus 2800 in the third embodiment shown in FIG. 28 is an apparatus in which the audio data encoding unit 204 of the image processing apparatus 200 in the first embodiment is replaced with an audio data encoding unit 2801.

For instance, in the case of mounting the image processing apparatus 2800 in the digital still camera and the digital video camera as illustrated in FIG. 9, it is considered that there are a case where the audio data to be inputted are only a speech and a case where the audio data are not under this category, depending on a point of time while the photographing is being conducted. The image processing apparatus 2800 of the present embodiment thus includes the audio data encoding unit 2801 having two encoders for encoding the speech data and general audio data, separately. Two sets of encoded audio data outputted from the two encoders are compared with each other in terms of acoustic qualities of the decoded audio data to store optimum encoded audio data.

This processing enables the audio data to be encoded with a high definition but brings about a rise in consumption of the electric power. The third embodiment therefore takes such a structure that the audio data are encoded by use of the two encoders during only the period for which the significant photographing is being conducted, particularly during only the ROI setting period.

Note that the two encoded audio data encoders provided in the third embodiment are of AAC (Advanced Audio Coding) for compressing various categories of audio data at a high efficiency if the bit rate is equal to or higher than 96 kbps, and of CELP (Code Excited Linear Prediction) superior in its encoding efficiency to the AAC with respect to the compression of the speech data at a bit rate equal to or lower than 64 kbps.

A frame data encoding method in the third embodiment is the same as the frame data encoding method in the embodiment 1, and therefore the explanation of the frame data encoding method is herein omitted.

Figure 29:
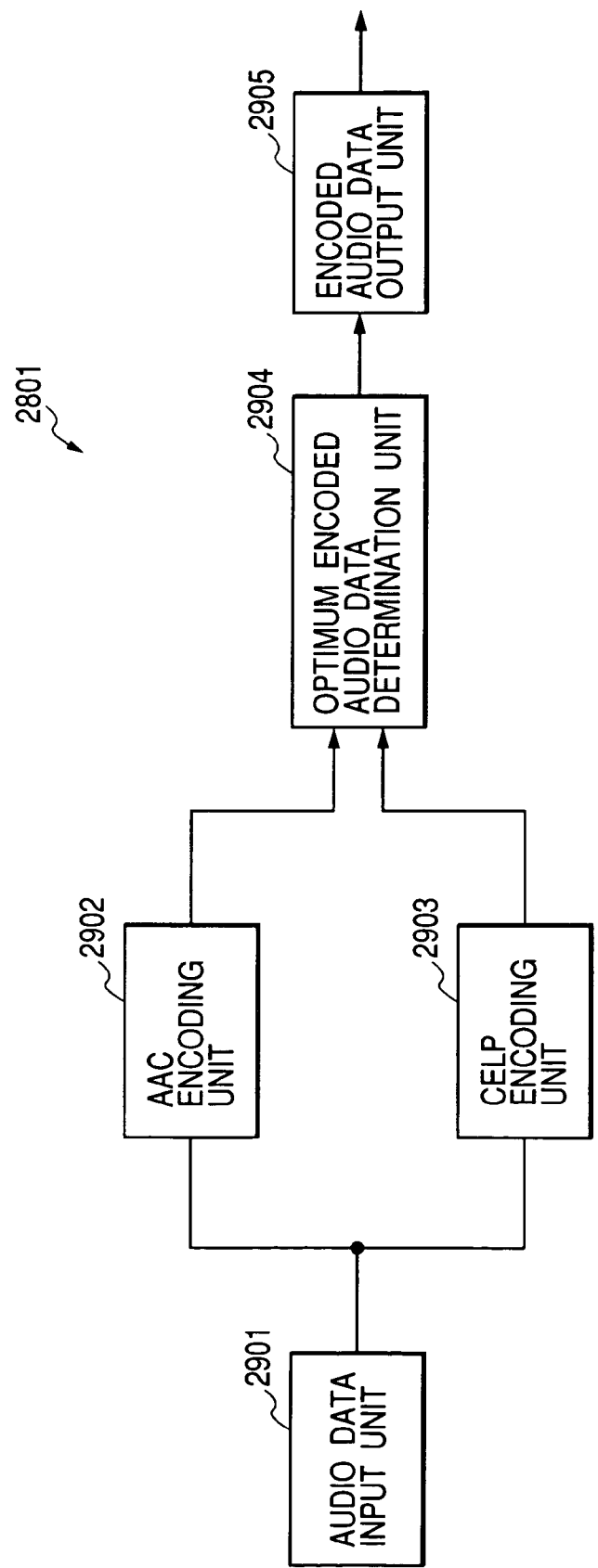
FIG. 29 is a block diagram of an audio data encoding unit 2801.

FIG. 29 shows a detailed block diagram of the audio data encoding unit 2801 in the third embodiment. The audio data shall be encoded at a bit rate on the order of 32 through 64 kbps in the third embodiment.

At first, in case the frame data are encoded without being subjected to the ROI setting, the audio data inputted flow to an AAC encoding unit 2902, wherein the audio data are encoded at the bit rate of approximately 32 kbps by the AAC encoding unit. Note that this AAC-based encoding method is well known, and hence its description is omitted.

Further, if the frame data are encoded after being subjected to the ROI setting, the audio data are inputted to the AAC encoding unit 2902 and the CELP encoding unit 2903. These two encoding units respectively encode the audio data, generate the encoded audio data and outputs the data to an optimum coded audio data determining unit 2904.

Figure 30:
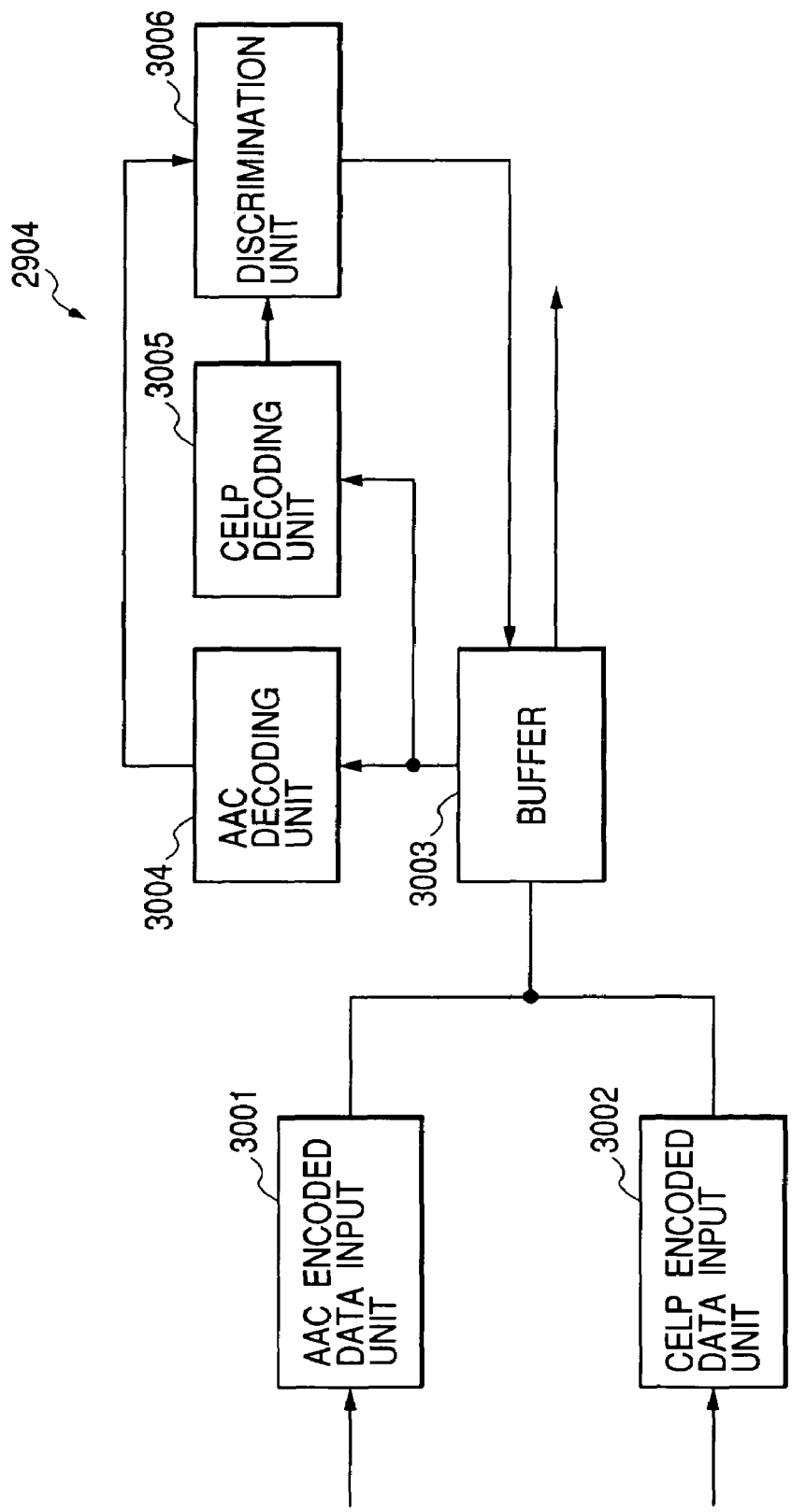
FIG. 30 is a block diagram of an optimum encoded audio data determination unit 2904.

Subsequently, an explanation of an operation of the optimum encoded audio data determining unit 2904 involves referring to a detailed block diagram of the optimum encoded audio data determining unit 2904 shown in FIG. 30.

To begin with, at a predetermined time interval, the encoded audio data (AAC encoded audio data) generated by the AAC encoding unit 2902 and the encoded audio data (CELP encoded audio data) generated by the CELP encoding unit 2903, are inputted respectively from an AAC encoded audio data input unit 3001 and a CELP encoded audio data input unit 3002 and temporarily accumulated in a buffer 3003.

An AAC decoding unit 3004 and the CELP decoding unit 3005 copy, to their internally-held memories, the AAC encoded audio data and the CELP encoded audio data that have been stored in the buffer 3003. After this copying, these two decoding units decode the encoded audio data corresponding thereto and respectively output the decoded data to a discrimination unit 3006. Note that an AAC-based decoding method and a CELP-based decoding method are well known, and therefore the details thereof are not described herein.

The discrimination unit 3006 discerns, based on a predetermined method, which decoded audio data obtained from the two decoded data exhibits a higher acoustic quality, by use of a predetermined parameter, then eliminates encoded audio data exhibiting a lower acoustic quality from on the buffer 3003, and outputs the encoded audio data exhibiting the higher acoustic quality to an encoded audio data output unit 2905 from the buffer 3003. The selected encoded audio data are outputted to the data integration unit 205 from the encoded audio data output unit 2905.

Note that what has been mentioned above is a description about the audio data encoding process when the image is subjected to the ROI setting and thus encoded, while when the ROI setting is not done, the data encoded in the AAC encoding unit 2902 are outputted as they are.

As described above the third embodiment has exemplified the method of using the audio encoder for speech and the audio encoder for other general audio data during only the ROI setting period of the image with judging the use thereof. This encoder using method enables the acoustic quality of the decoded audio data during the ROI setting period to be more enhanced than the acoustic quality of the decoded audio data during the ROI non-setting period.

Other Embodiments

All the embodiments involve utilizing the discrete wavelet transform for the series transform of the frame data, however, the present invention is not limited to this wavelet transform. There is no problem if a discrete cosine transform etc., may also be utilized for the series transform.

Note that the present invention may be applied as a part of a system constructed of a plurality of appliances (e.g., a host computer, an interface appliance, a reader, a printer and so on) or may be so applied as to be mounted in a part of an apparatus constructed of one single appliance (for example, a copying machine, the digital still camera, the digital video camera and so forth).

Moreover, the present invention is not confined to only the apparatus and the method for actualizing the embodiments discussed above, and the scope of the present invention includes a case of actualizing the embodiments discussed above by supplying a computer (a CPU (Central Processing Unit) or an MPU (Microprocessing Unit)) within the system or the apparatus with software program codes for actualizing the embodiments discussed above and by making the computer within the system or the apparatus operate a variety of devices in accordance with the program codes.

Further, in this case, the software-related program codes themselves actualize the functions of the embodiments discussed above, and the scope of the present invention therefore includes the program codes themselves and a means for supplying these program codes to the computer, to be specific, a storage medium stored with the program codes given above.

The storage medium stored with these program codes can involve the use of, e.g., a floppy disk, a hard disk, an optical disk, a magneto-optic disk, a CD-ROM, a magnetic tape, a nonvolatile memory card, a ROM and so on.

Moreover, those program codes are included in the scope of the present invention in a case where the embodiments discussed above are actualized in such a way that the program codes cooperate with OS (Operating System) running on the computer or other application software, etc. as well as in the case where the functions of the embodiments discussed above are actualized by the computer's controlling the variety of devices in accordance with only the program codes supplied.

Still further, the scope of the present invention includes a case in which the program codes supplied are stored in the memory provided in a function extended board of the computer or in a function extended unit connected to the computer, thereafter the CPU, etc. provided in the function extended board or in the function extended unit executes a part or the whole of the actual processing on the basis of instructions of the program codes, and the embodiments discussed above are actualized by this process.

As discussed above, according to the present invention, in case there is differentiated in the degree of significance between the frames of the moving image due to the ROI setting, etc., the acoustic quality of the audio data can be changed in accordance with the degree of significance of the frame, whereby the moving image and voice exhibiting a high visual effect can be reproduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image and audio processing apparatus comprising:
an input unit configured to input image data and audio data corresponding thereto;
an image encoder configured to encode the image data input by said input unit;
a first audio encoder configured to encode the audio data input by said input unit by an audio encoding method for encoding general audio data;
a second audio encoder configured to encode the audio data input by said input unit, by another audio encoding method which is suitable for encoding speech data;
an image encoding setting unit configured to set the encoding for said image encoder to encode the image data so that a partial region in each of frame images included in the image data is encoded with a high image quality;
an audio encoding unit including said first encoder and said second encoder, said audio encoding unit being configured to operate said first audio encoder and said second audio encoder in accordance with whether said image encoding setting unit sets the encoding to make the partial region in each of frame images the high image quality, such that (1) the audio data is encoded by said first audio encoder to provide audio encoded data irrespectively of whether said image encoding setting unit effects the setting of the encoding, and (2) the audio data is encoded by each of said first audio encoder and said second audio encoder in a time period corresponding to the encoding set by said image encoding setting unit so that one of the respective audio encoded data provided by said first audio encoder and said second audio encoder is selected during the time period; and
a data integration unit configured to integrate the encoded audio data provided by said audio encoding unit with encoded image data encoded by said image encoder in accordance with whether said image encoding setting unit sets the encoding for said image encoder, so as (a) to integrate, with the encoded image data encoded by said image encoder, a selected one of the respective encoded audio data provided by said first audio encoder and said second audio encoder in a case that said image encoding setting unit effects the setting of the encoding, and (b) to integrate, with the encoded image data encoded by said image encoder, the encoded audio data provided by said first audio encoder in a case that said image encoding setting unit does not effect the setting of the encoding, thereby outputting the integrated encoded data.

2. An apparatus according to claim 1, wherein said image encoding setting unit makes the setting so as to encode a region, with the high image quality, including an arbitrary object in the image data.

3. An apparatus according to claim 2, wherein said image encoding setting unit makes ROI setting of the region including the arbitrary object, and
wherein said image encoding unit executes ROI encoding.

4. An apparatus according to claim 1, wherein said image encoding setting unit makes the setting so as to encode the partial region of the image data with the high image quality in accordance with a user's instruction for designating an object displayed on a display screen.

5. An apparatus according to claim 4, wherein said image encoding setting unit makes the ROI setting in accordance with the user's instruction, and wherein said image encoder executes the ROI encoding.

6. An apparatus according to claim 1, wherein said data integration unit selects encoded audio data having higher quality by comparing audio quality of the encoded audio data provided by said first audio encoder and audio quality of the encoded audio data provided by said second audio encoder, and integrates the selected encoded audio data with the encoded image data.

7. An image and audio processing method comprising:
an input step of inputting image data and audio data corresponding thereto;
an image encoding step of encoding the image data input by said input step;
a first audio encoding step of encoding audio data input by said input step, by an audio encoding method for encoding general audio data;
a second audio data encoding step of encoding the audio data input by said input step, by another audio encoding method which is suitable for encoding speech data;
an image encoding setting step of setting the encoding in said image encoding step to control an image quality of encoded image data in accordance with a partial region in each of frame images included in the image data;
an audio encoding step of performing said first audio encoding step and said second audio encoding step in accordance with whether said image encoding setting step sets the encoding to make the partial region in each of frame images the high image quality, such that (1) the audio data is encoded by said first audio encoding step to provide audio encoded data irrespectively of whether said image encoding setting step effects the setting of the encoding, and (2) the audio data is encoded by each of said first audio encoding step and said second audio encoding step in a time period corresponding to the encoding set in said image encoding setting step so that one of the respective audio encoded data provided by said first audio encoding step and said second audio encoding step is selected during the time period;
a data integration step of integrating the encoded audio data provided in said audio encoding step with encoded image data encoded in said image encoding step in accordance with whether the encoding is set in said image encoding setting step, so as to (a) integrate with the encoded image data encoded in said image data encoding step, a selected one of the respective encoded audio provided in said first audio encoding step and said second audio encoding step in a case that said image encoding setting step effects the setting of the encoding, and (b) to integrate, with the encoded image data encoded in said image encoding step, the encoded audio data provided in said first audio encoding step in a case that said image encoding setting step does not effect the setting of the encoding, thereby outputting the integrated encoded data.

8. A method according to claim 7, wherein said image encoding setting step includes setting so as to encode a region, with the high image quality including an arbitrary object in the image data.

9. A method according to claim 8, wherein said image encoding setting step includes making ROI setting of the region including the arbitrary object, and
wherein said image encoding step includes executing ROI encoding.

10. A method according to claim 7, wherein said image encoding setting step includes setting so as to encode the partial region of the image data with the high image quality in accordance with a user's instruction for designating an object displayed on a display screen.

11. A method according to claim 10, wherein said image encoding setting step includes making the ROI setting in accordance with the user's instruction, and wherein said image encoding step includes executing the ROI encoding.

12. A method according to claim 7, wherein said data integration step includes selecting encoded audio data having higher quality by comparing audio quality of the encoded audio data provided in said first audio encoding step and audio quality of the encoded audio data provided in said second audio encoding step, and integrating the selected encoded audio data with the encoded image data.

13. A storage medium storing a program executable by a data processing apparatus, said program including program codes for realizing an image processing method described in claim 7.

* * * * *